United States Patent
Benner et al.

(10) Patent No.: US 11,333,629 B2
(45) Date of Patent: May 17, 2022

(54) ION MOBILITY SPECTROMETER WITH CENTER ROD

(71) Applicant: ION DX, INC., Monterey, CA (US)

(72) Inventors: W. Henry Benner, Danville, CA (US); Michael J. Bogan, Pacific Grove, CA (US); Ben Aguilar, Monterey, CA (US)

(73) Assignee: ION DX, INC., Monterey, CA (US)

( * ) Notice: Subject to any disclaimer, the term of this patent is extended or adjusted under 35 U.S.C. 154(b) by 0 days.

(21) Appl. No.: 17/259,081

(22) PCT Filed: Jul. 10, 2019

(86) PCT No.: PCT/US2019/041253
§ 371 (c)(1),
(2) Date: Jan. 8, 2021

(87) PCT Pub. No.: WO2020/014396
PCT Pub. Date: Jan. 16, 2020

(65) Prior Publication Data
US 2021/0278369 A1 Sep. 9, 2021

Related U.S. Application Data

(60) Provisional application No. 62/696,162, filed on Jul. 10, 2018.

(51) Int. Cl.
*G01N 27/622* (2021.01)

(52) U.S. Cl.
CPC ................ *G01N 27/622* (2013.01)

(58) Field of Classification Search
CPC ..... G01N 27/622; G01N 27/624; H01J 49/00; H01J 49/02; H01J 49/0027; H01J 49/0422;
(Continued)

(56) References Cited

U.S. PATENT DOCUMENTS 3,986,111 A 10/1976 Sellers
4,831,254 A 5/1989 Jenkins
(Continued)

FOREIGN PATENT DOCUMENTS

GB 2395355 5/2004
WO 2016079780 5/2016

OTHER PUBLICATIONS

ISA/KR, Korean Intellectual Property Office, International Search Report and Written Opinion dated Oct. 28, 2019, related PCT international application No. PCT/US2019/041253, pp. 1-9, claims searched, pp. 10-16.
(Continued)

*Primary Examiner* — Jason L McCormack
(74) *Attorney, Agent, or Firm* — O'Banion & Ritchey LLP; John P. O'Banion; John P. Wooldridge

(57) ABSTRACT

Apparatuses and methods are described for determining properties of ions travelling through a gas under the influence of an electric field. The apparatuses and methods can be understood to provide measurements of the electrical mobility of ions as useful for determining the electrical mobility constant Ko of electrosprayed substances, such as proteins. The apparatuses and methods relate to the scientific discipline of ion mobility spectrometry. Modules connected to ion mobility spectrometers provide stress to substances for the purpose of investigating, for example, the thermal stability of proteins. One form of the technology includes a tubular spectrometer body having an electrically conductive inner wall; a rod positioned along the longitudinal center of the body and electrodes positioned on, but electrically isolated from, the inner wall, where the ratio of the radius of the tubular spectrometer body to the radius of the rod is at least 20.

33 Claims, 16 Drawing Sheets

(58) Field of Classification Search
CPC ........ H01J 49/06; H01J 49/062; H01J 49/063; H01J 49/065; H01J 49/066; H01J 49/068
USPC ........................................ 250/281, 282, 293
See application file for complete search history.

(56) References Cited

U.S. PATENT DOCUMENTS

| | | | |
|---|---|---|---|
| 5,140,158 A * | 8/1992 | Post | B01D 59/44 250/281 |
| 2005/0109930 A1 * | 5/2005 | Hill, Jr. et al. | G01N 27/622 250/286 |
| 2006/0219889 A1 | 10/2006 | Shvartsburg | |
| 2008/0142697 A1 | 6/2008 | Dahl | |
| 2017/0263427 A1 | 9/2017 | Benner | |
| 2017/0299551 A1 | 10/2017 | Zaleski | |

OTHER PUBLICATIONS

European Patent Office (EPO), Communication (Extended European Search Report) dated Mar. 18, 2022, related European patent application No. 19835183.5, pp. 1-8, claims searched, pp. 9-12.

* cited by examiner

Module 1 - A liquid sample is held in a chamber or a syringe where it can be processed, eg., heated. This module delivers sample at a flow rate amenable to electrospray at 10-1000 nL/min range Module 2 – While the sample is conducted to (3) it can be treated by exposure to physical processing, chemical reactants or a clean-up process, such as heating, addition of acid and in-line desalting.

Module 3- Ions are generated by the electrospray process. Control of the electrospray process can be provided by feedback from an electrospray current measuring sensor or an image recognition camera and software. A flow(s) of gas transports electrospray ions to (4).

Module 4 - Ions can be processed to alter the charge they carry, processed physically, such as by heating, or with reactant gas(s).

Module 5 - Ions are subjected to ion mobility separation such such as with the present invention.

FIG. 1B

1) Sample modifying process with controller plus sample delivery with controller 2) In-line sample modifying process with control 3) Ion generating process and controller 4) Ion modifying process and controller 5) Ion mobility separation and controller

FIG. 1A

ION MOBILITY SPECTROMETER WITH CENTER ROD

CROSS-REFERENCE TO RELATED APPLICATIONS

This application claims the benefit of U.S. Provisional Patent Application No. 62/696,162 titled "Ion Mobility Spectrometer with Center Rod," filed Jul. 10, 2018, incorporated herein by reference.

BACKGROUND

Field

The present technology relates to ion mobility spectrometry, and more specifically, it relates to techniques which determine ion mobility constants Ko for proteins.

Description of Related Art

Ion mobility separates gas-phase ions as a result of the competing interplay between aerodynamic drag and electrostatic forces. Small ions experience less aerodynamic drag and fly faster through a gas under the influence of an electric field than larger ones. Differences in aerodynamic drag between compact and extended conformations of the same molecule allows ions to be separated according to their cross-sectional area (CSA) in an ion mobility spectrometer. Stretched out ions have a larger cross-sectional area. Several types of ion mobility spectrometry provide important measures of biomolecular substances (Lanucara; Lee; Zucker; Konermann; Jones; Bagal; Uetrecht). Their confusing and overlapping names lead to misunderstanding of their applicability to biomolecular analyses (Cumeras). Drift tubes comprise a first type of an ion mobility instrument (Clemmer; Pacholarz; Wyttenbach), fast asymmetric ion mobility spectrometers (FAIMS) (Shvartsburg) is a second type, nano-differential mobility analyzers (nDMA) is a third type (D. R. Chen; Bacher; Fernandez de la Mora; Guha) and ion mobility mass spectrometers (IMS-MS) is a fourth type.

The structure of proteins determines their function. One way to study protein structure is to measure the cross-sectional area of a protein molecule. Small molecular weight proteins have relatively small CSA compared to higher molecular weight proteins. Ion mobility instruments, through the measurement of CSA, have revealed important information about the structure of proteins (Beck, Benesch; Berkowitz; Vahidi). It has been reported that ions of similar molecular weight can have different CSA's. It has also been reported that an individual protein may have a variation in CSA or even several dominant CSA's that are representative of several different conformations. The CSA of a protein can vary because of solution conditions, because of stresses like heat when a protein is heated and simply because the protein misfolded when it was synthesized by a cell.

Typically, electrospray ionization is used to transfer molecules in solution into the gas phase where ion mobility measurements are carried out. The electrospray process introduces several problems related to measuring a protein ion's electrical mobility. These problems complicate the use of ion mobility to measure a protein's CSA. Electrosprayed ions are highly charged and Coulombic repulsion among the charges carried by an electrospray ion distort the shape of a protein ion, forcing it to stretch out in the gas phase. The issue could be solved by measuring singly-charged ions.

The electrospray process converts substances in solution to gas-borne ions. The substances in solution can be understood to be the sample. An example of a sample is a protein dissolved in an aqueous buffer. An example of a way to generate electrospray ions for ion mobility analysis is to use a model 3482 electrospray generator commercially available from TSL, Inc.

Sample processing can be understood to be the addition of or the removal of a substance from the sample or the application of a physical process such as heat or cooling to the sample. Samples prepared for electrospray ion mobility spectrometry are typically desalted and buffer-exchanged before they are analyzed. These processes are commonly performed with disposable dialysis chambers, spin filtration using molecular weight cut-off membranes or with liquid chromatographs. Typically, these sample preparation steps are performed before a sample is electrosprayed and not during the time the sample is electrosprayed.

Two commonly used techniques for producing ion mobility measurements begin by introducing ions into a space between two metal electrodes. The space between electrodes may be the annular space between two concentrically aligned cylinders or the space between two parallel electrode plates. Cylindrical chambers, such as the nano-differential mobility analyzer (nDMA, manufactured by TSI, Inc.) is one example of an ion mobility separating device. The parallel plate arrangement, such as the "Half-Mini" differential mobility analyzer (DMA) manufactured by SEADM is a second example of an ion separating device. A condensation particle counter, such as the model 3775 manufactured by TSI, Inc is an example of an ion detector that can be used in combination with a nDMA or a parallel plate DMA. The Fast Mobility Particle Sizer Spectrometer (FMPS Model 3091, TSI, Inc) is another version of an ion mobility spectrometer. It detects ions by measuring a current produced as they hit a metal electrode connected to a current measuring device, such as an ammeter.

The operating principles of the nDMA are well known by experts in the field. It is a device based on the concentric alignment of two metal cylinders—a smaller one located inside a larger one. A flow of gas called a sheath flow is introduced into the annular space between the two cylinders. Ions are injected into a portion of the sheath flow along the inside of the outer cylinder. The injected ions, as they are carried by the flow of sheath gas, are subjected to an electric field produced by a first voltage applied to the outer cylinder and a second voltage applied to the inner cylinder. The electric field forces the injected ions to traverse the annular space. An ion detector connected to the inner cylinder provides a way to detect ions of a specific mobility. Knowledge of the width of the annular spacing between the inner and outer cylinders, the sheath gas flow rate, the voltages applied to each cylinder and the length of the annular space provide experts in the field a way to calculate ion mobility using an appropriate mathematical equation.

The operating principles of a parallel plate ion nobility analyzer are similar to the operating principles of the nDMA but instead of providing an electric field across the annular space between two concentric metal cylinders, an electric field between two parallel metal plates is used.

A third type of apparatus for measuring ion mobility is a time-of-flight (ToF) ion mobility spectrometer. The most common examples of ToF ion mobility spectrometers are ion mobility spectrometers that are operated in tandem with a mass spectrometer. These apparatuses are called ion mobility mass spectrometers and are operated in a two-step process—ions are first subjected to mobility analysis, typically by means of a drift tube, and subsequently subjected to mass analysis by use of a mass spectrometer.

The nDMA and parallel plate DMA's are typically operated at atmospheric pressure. This pressure regime allows ions to be detected using a condensation particle counter (CPC). ToF ion mobility spectrometers typically are operated at sub-atmospheric pressure, typically less than 0.5 Atm., which precludes the use of a CPC.

The processing of gaseous ions can be and understood to be an alteration that is made to physically or compositionally modify ions in the gas-phase. A common form of ion processing in ion mobility spectrometry is to reduce the charge carried by electrospray ions by exposing them to a bipolar cloud of air ions. Another method is collisional induced dissociation that causes ions to fragment. Applying heating or cooling to ions in the gas phase are additional ways to modify ions.

A few methods are used to detect ions in ion mobility spectrometers. These methods include measuring an ion current with an electrical current sensor, detecting them with an ion multiplier detector or detecting them with a condensation particle counter (CPC). Ions and charged particles can also be detected electrically by measuring the current deposited by ions or charged particles as they collect on a pick-up electrode using an electrometer described in U.S. Pat. No. 7,230,431.

Prior art for ion mobility measurements has not defined a means to measure the changes in the ion mobility properties of a sample, such as average electrical mobility or the variation of ion mobility properties of a sample or of specific ions, concurrently with a period of time when the sample is exposed to physical or chemical stresses. An example is the lack of technology to measure the changes in the ion mobility properties of a sample while it is heated or while it is exposed to degrading chemicals. A second example of the lack of technology for measuring changes in the ion mobility properties of a sample, relates to the speed at which an ion mobility spectrum can be collected. Cylindrical and parallel plate ion mobility spectrometers have scan times of about 2 minutes. Slow scan times limit the amount of information that can be collected while a sample is being processed and typically necessitates that only one ion's mobility can Ix monitored. A choice has to be made as to which ion is monitored. To capture data for different ions, the analysis has to be repeated with different instrument settings. The capability to produce rapid ion mobility scans, particularly of singly-charge electrospray ions would advance the field of ion mobility spectrometry. The FMPS provides faster scan times but is not well suited for protein analysis.

SUMMARY

The apparatuses described here provide improved control of methodologies for determining ion mobility. The improved measurement scheme, described in block form in FIGS. 1A and 1B, provides an overview of the present technology and shows how combinations of new apparatus modules, when operated in conjunction with prior art, leads to improvements to ion mobility determinations. Apparatuses, comprised of modules selected from FIG. 1, are used to determine the average ion mobility for a substance and the variation of substance's ion mobility. We describe apparatuses for determining the variation of a substances ion mobility while a sample is processed or while a population of ions is processed. We additionally describe a way to determine a substance's average cross-sectional area and the variation of a substance's cross-sectional area.

The present technology describes apparatuses and methods for quantifying ions during ion mobility measurements. A second feature of the present technology provides a way to determine the CSA of gas-phase molecular ions. A third feature of the present technology provides a way to determine the variation on CSA of molecular ions and a final feature provides a way to determine the CSA and variation of CSA after a molecule, such as a protein, has been exposed to conditions that can degrade the protein. The apparatuses described here provide control of ion generation, ion processing, ion separation via mobility, ion detection and the control of gas flows for transporting ions through such devices. The components of the apparatuses can be understood to comprise an ion mobility spectrometer.

BRIEF DESCRIPTION OF THE DRAWINGS

The accompanying drawings, which are incorporated into and form a part of the disclosure, illustrate embodiments of the technology and, together with the description, serve to explain the principles of the technology.

FIG. 1A generally shows modules useable in an ion mobility apparatus of the present technology.

FIG. 1B describes modules for the ion mobility apparatus of FIG. 1A.

DETAILED DESCRIPTION OF THE TECHNOLOGY

Figure 2A:
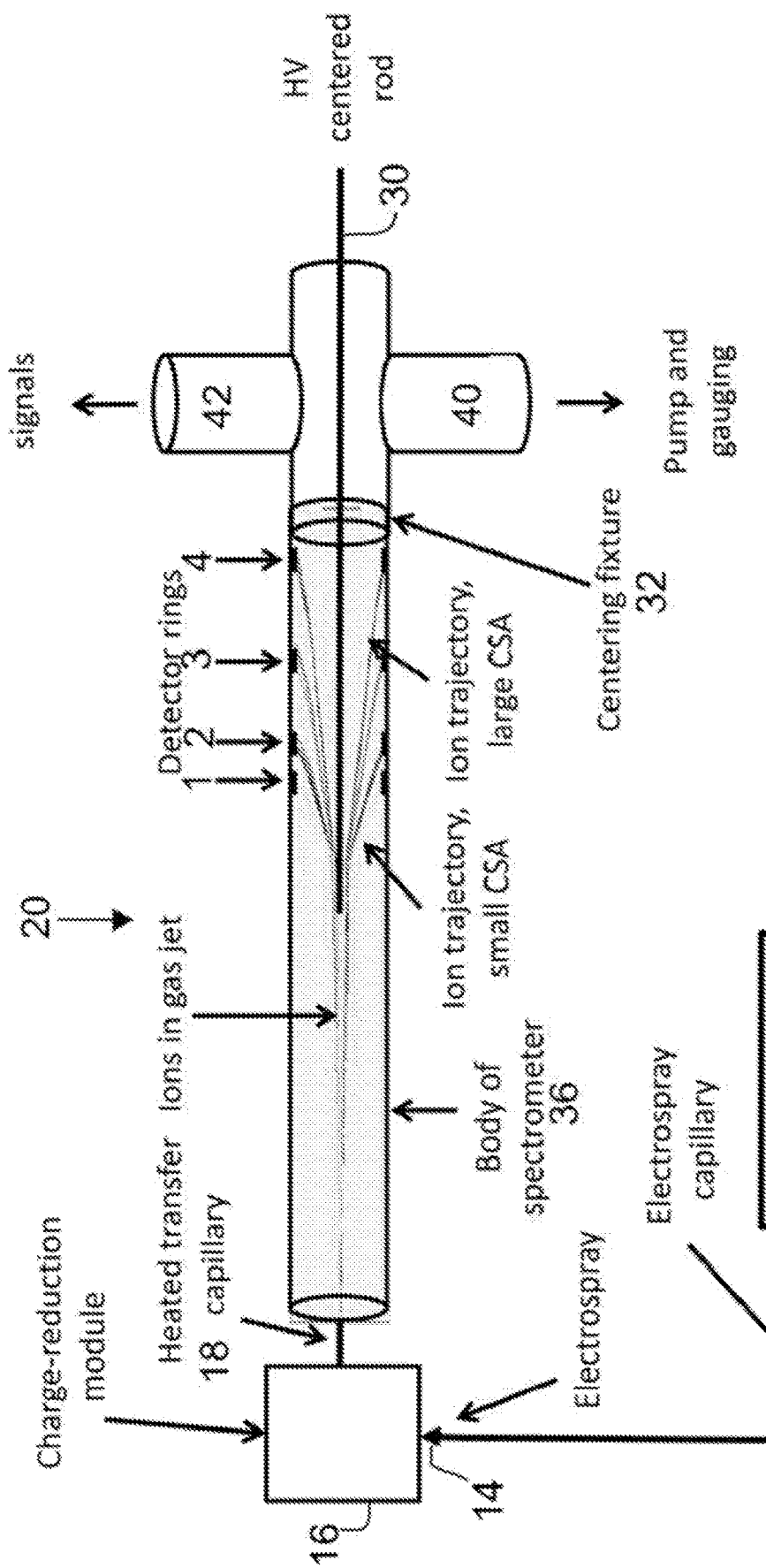
FIG. 2A shows an embodiment of the technology.

The modules useable for the analytical scheme and concept for an ion mobility apparatus of the present technology are presented generally in FIG. 1A and descriptions of the modules are given FIG. 1B. Beginning with module 1, a flow of liquid sample in the range of 10-1000 nL/min is pumped through a capillary tube by means of pressure. Gas pressure can be applied to a chamber containing a reservoir of a liquid sample. The sample escapes from the chamber through a capillary tube inserted into the liquid and sealed to the wall of the chamber. The liquid sample can alternatively be pumped through the capillary by means of a syringe that is loaded with the liquid sample and has a piston that expresses liquid from the syringe. The piston can be connected to a syringe pump. The liquid sample alternatively can be pumped through the capillary with a fluidics pump. In one embodiment the syringe is heated or cooled. The flow of sample from the reservoir or the syringe can he controlled by feedback from a flow sensor.

During the time the liquid sample resides in the pressurized chamber or in the syringe, the liquid sample can be exposed to physical stress, such as heat, cold or light. For example, heat can he applied to the wall of a pressurized chamber which in turn conducts heat to the sample. The manner which the liquid sample is exposed to a physical stress could be constant, a step-wise process during which the intensity of the exposure is increased in steps or by a steadily-changing process such as the application of ramped heating. During the time the sample resides in the reservoir, a chemical reagent could be added to the liquid sample as a way to introduce a chemical stress to the sample.

An alternative technique for processing a sample, designated as Module 2 in FIG. 1, is to apply physical or chemical stress to the liquid sample as it is pumped from the pressurized chamber or syringe. This can be realized by positioning a heater or chiller around the capillary tube that conducts liquid from the pressurized chamber or the syringe. In this approach, the heater or chiller could be operated isothermally, set to values of constant physical or chemical stress, such as a 30-degree setting, a 40-degree setting, and further temperature steps approaching a boiling point setting established by the properties of the liquid. The sample could be subjected to a chemical stress by introducing a small flow of a liquid chemical through a TEE in the capillary that conducts the sample from the reservoir to the next module. The TEE provides a way to mix the chemical stressor with the liquid sample. An aspect for sample processing is the design of a heater or chiller that surrounds the capillary that conducts the liquid sample from the reservoir or syringe to the next module.

Module 3 in FIG. 1, provides a means for electrospraying the liquid sample. One example of this module is a commercially available electrospray source (Model 3480, TSI, Inc.), Controlling the flows of gases that are introduced into the Model 3480 is provided by low-resolution rotameters. One aspect of the current technology is to provide stable delivery of gases to an electrospray generator by using mass flow controllers that are accurate to +/−2% of the full-scale flowrate so that accurate quantitation of the electrosprayed ion concentration can be obtained. A first mass flow controller introduces a stable flow of air into an electrospray ion generating chamber so that the resulting ion-laden gas can be introduced into a mobility analyzer. A second mass flow controller introduces an auxiliary flow of gas, such as $CO_2$ or another corona-suppressing gas, into the same ion generating chamber for the purpose of influencing the ion generating process. The application of mass-flow controllers is illustrated in FIG. 1B with module description 3. An additional feature of the present apparatus is to locate a camera on the ion generating chamber for the purpose of visually observing the ion generating process. Furthermore, a feature of the present technology is to use image recognition software, along with a sensor to monitor the electrospray current, as a means to provide feedback to the electrospray process for the purpose of improving the stability of the electrospray process.

Module 4 in FIG. 1B presents a means for processing electrospray ions, such as by heating the gas-phase ions before they are transported to Module 5. UV light generator's or alpha-emitting radioactive sources, such as a Polonium source, have been described to alter the charge on electrospray ions. It can be understood that the means of processing the electrospray ions is to control the strength of the polonium source. One way to control the strength of the polonium source is to place an aperture between the electrospray droplets and the polonium. A set of exchangeable apertures could be thin sheets of metal, each with different size holes in the range of 1 to 25 mm in diameter. The aperture could also be an adjustable aperture such as an iris.

Module 5 in FIG. 1B illustrates the implementation of the present technology in the overall analytical scheme. One embodiment of the body of the spectrometer (FIG. 2A) is a 5 cm diameter×1.0 m long cylindrical tube 20. Ions are injected into the reduced pressure environment (4.0 torr) of the spectrometer by means of a 1.0 mm id×20 cm long heated SS capillary 18. The capillary protrudes 1.0 cm into the entrance end of the body of the spectrometer and is aligned with the centerline of the evacuated tube. The capillary is maintained at 100 C. A 0.4 mm diameter nozzle, mounted onto the exit end of the capillary, serves as a critical orifice to control the flow of ion-laden gas into the spectrometer at 1.2 Lpm. A 1 mm diameter×0.5 m long SS rod is inserted into the exit end of the body of the spectrometer and is held in place with a centering fixture located at the exit to the body of the spectrometer.

FIG. 2A provides an illustration of an embodiment of the present technology. In one embodiment, an electrospray device positioned near the inlet to the ion mobility spectrometer generates gas-phase ions in a flow of gas. A sample is heated within a sample heater 10 (or capillary heater 10). The sample flows through electrospray capillary 12 and electrospray nozzle 14 into a charge-reduction module 16 from which is passes through a heated transfer capillary 18 into spectrometer 20.

Figure 2B:
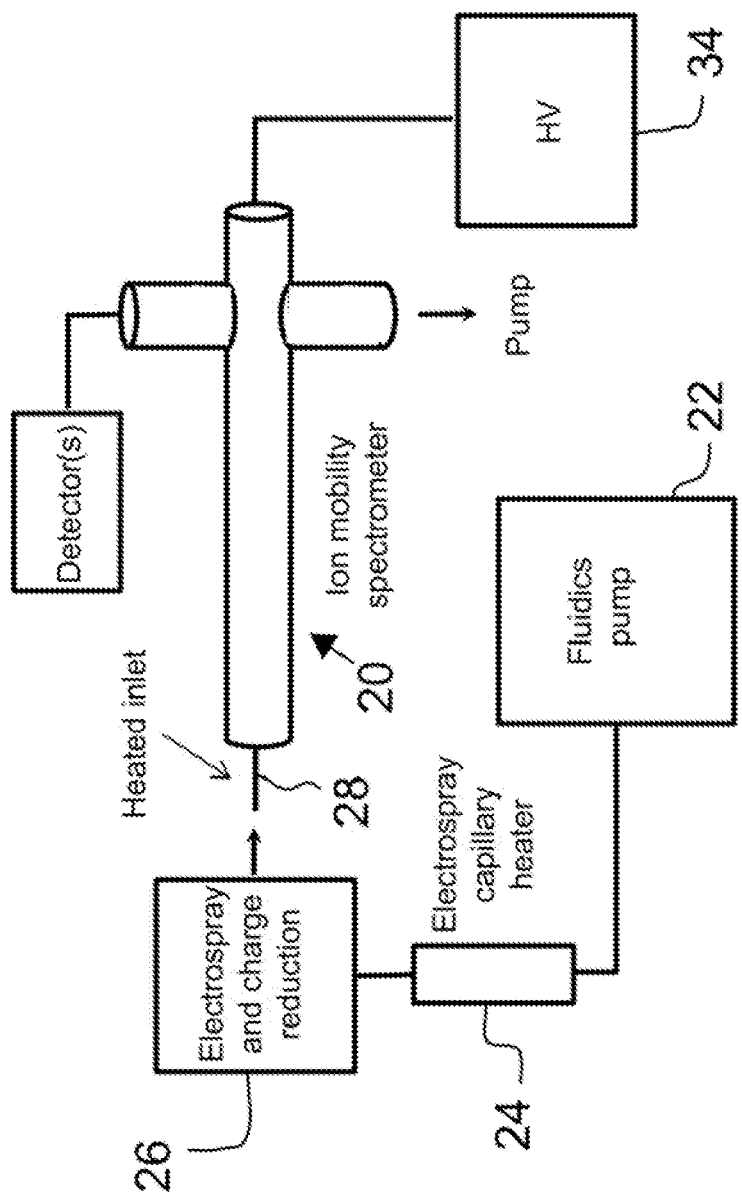
FIG. 2B shows an alternate apparatus for injecting the sample into the spectrometer of FIG. 2A.

FIG. 2B shows an alternate apparatus for injecting the sample into the spectrometer 20, which in this embodiment, is identical to that of FIG. 2A. A sample is pumped by fluidics pump 22 through electrospray capillary heater 24 and into electrospray and charge reduction element 26. The sample passes from element 26 through a heated inlet 28 and into spectrometer 20. Those familiar with the electrospray process will understand that to have an electrospray capillary there must be a means to provide voltage to produce an electrospray. The flowing gas, such as air flowing a 1.5 Lpm, transports the ions to the entrance of a heated capillary. A pressure differential across the length of the heated capillary draws the ion-laden gas into and through the capillary. A nozzle attached to the exit end of the capillary produces a well-defined gas jet that carries the ion-laden ions into a reduced pressure environment inside the tube-shaped ion mobility spectrometer 20.

The jet that enters the spectrometer 20 of FIGS. 2A and 2B is aimed at a rod 30 positioned with a centering fixture 32 along the longitudinal center of the spectrometer. The rod is called a centered rod. Voltage source 34 applies a high voltage to the centered rod to establish an electric field between the rod and the inner wall of the body of the spectrometer. As the jet of ions approaches the rod, positive voltage applied to the rod begins to repel positive ions away from the center rod. The jet of gas expands around the centered rod and provides a gaseous medium across which the ions migrate under the influence of the radial electric field established by voltage applied to the rod and an electrically grounded metal cylinder 36 surrounding the rod.

Smaller ions carried by the gas jet acquire a higher radial velocity than their larger counterparts and reach the wall of the spectrometer before larger ions. Because of the magnitudes of the electric field and gas velocity, smaller ions also travel a shorter distance and reach the wall of the spectrometer soon after they approach the rod. Larger ions strike the wall further downstream This simple design concept provides a way to repel ions according to their size, i.e., their electric mobility, towards different longitudinal positions along the length of the spectrometer. By positioning one or more ring electrodes, see e.g., FIG. 2A, reference numbers 1-4, on the inner wall of the body of the spectrometer, a current generated by ions striking a ring provides a way to measure the GSA of specific ions. FIGS. 1A and 1B illustrate the operating principle. A sample is heated in an external chamber, either isothermally or with a heating ramp and the thermally stressed sample is conducted through an electrospray capillary to the tip of the capillary where the sample is ionized by the electrospray process. Alternatively, a sample is heated isothermally or with a heating ramp as it is conducted through electrospray capillary. A tube heater 10, through which the electrospray capillary passes, provides a means to heat the electrospray capillary. A preferred technique for simplifying the ion measurements is to reduce the charge on highly-charged electrospray ions to one or two charges using air ions produced by a radioactive Polonium source. The charge-reduction module contains a Polonium source. An alternative method to reduce the charge on highly-charged electrospray ions is to use a source of low energy photons such as low energy x-rays. Spectrometer 20 is evacuated through port 40. Signals are collected through port 42.

As discussed above, charge-reduced ions are conducted through a heated transfer capillary 28 positioned on the inlet to the spectrometer. In one embodiment, the transfer capillary is approximately 0.9 mm id, 1.1 mm od and 10 cm long. It is heated to a temperature of 100 C with resistance wire wrapped around the outer diameter of the transfer capillary. Electrical power provided to the resistance wire provides heat to the transfer capillary. The heated transfer capillary helps to dry the charge-reduced ions before they enter the body of the spectrometer. The exit end of the heated capillary is equipped with a smaller diameter orifice, approx. 0.4 mm id, that serves as a critical orifice and limits the flow of ion-laden gas that enters the spectrometer. A jet of ion-laden gas produced by the critical orifice, is directed to flow on the centerline of the spectrometer. A narrow diameter rod, approximately 2 mm in diameter in one embodiment, is positioned also on the center line of the spectrometer but enters the body of the spectrometer through an opposing port on the spectrometer. The jet of gas flows around the centered rod. Voltage applied to the centered rod produces an electric field that deflects ions away from the rod towards the wall of the spectrometer. The ring electrodes positioned on the inner wall of the spectrometer serve as pick-up electrodes for collecting ion currents generated as deflected ions strike the electrodes. The ring electrodes can be located at optimal positions so that ions of one or more predetermined electrical mobilities strike separate ring electrodes, Currents conducted away from the ring electrodes are measured with electrometers or ampere meters. Small ions hit the first ring electrode and larger ions hit ring electrodes at positions farther into the spectrometer. The ring electrodes can be positioned strategically to collect ions of predetermined sizes.

Figure 7:
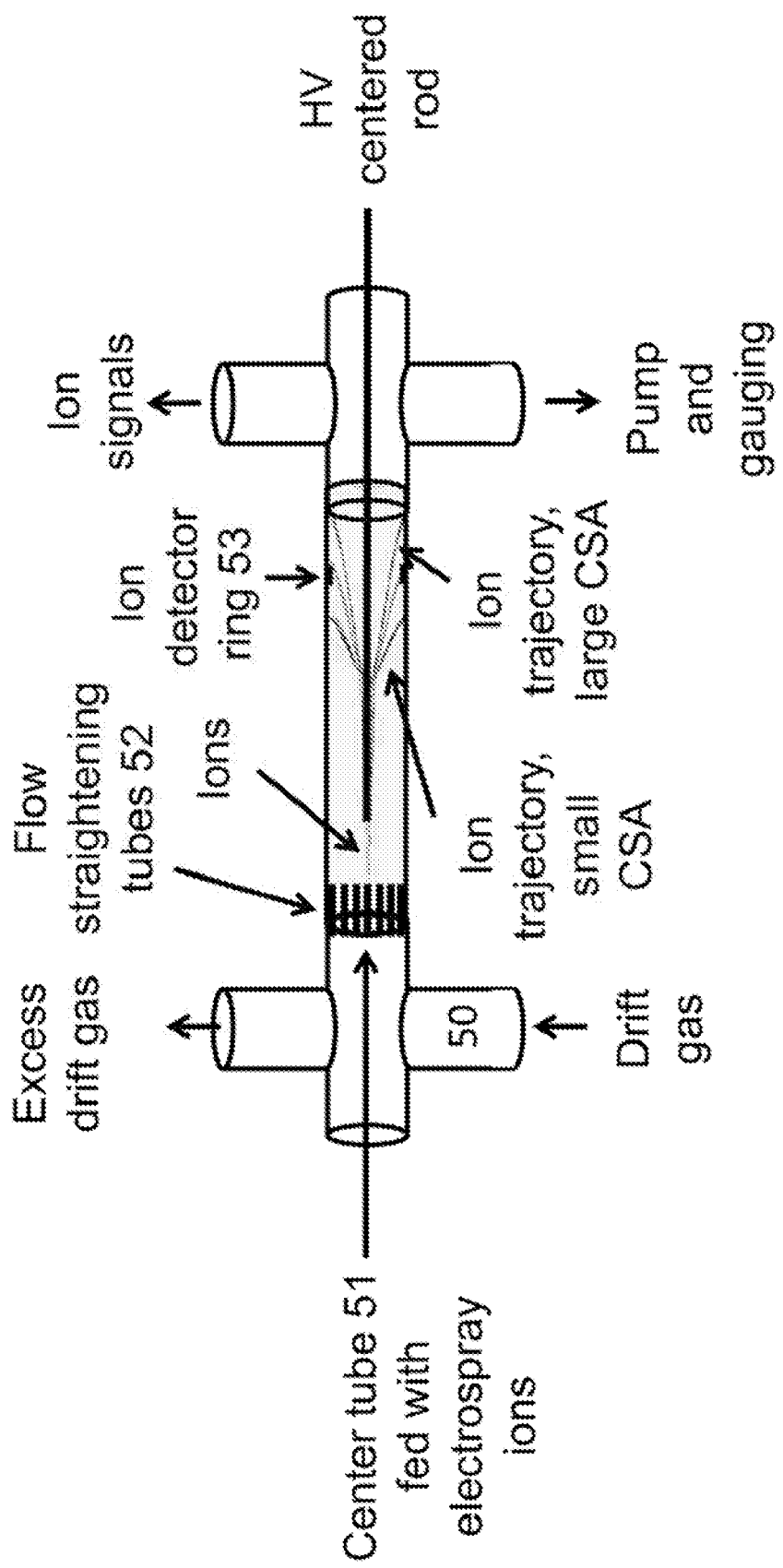
FIG. 7 shows another embodiment of the present technology.

In another embodiment, the spectrometer is operated within a few torr of atmospheric pressure, in this embodiment the heated transfer capillary 18 is replaced with a ¼" diameter heated metal tube attached to the output from the charge-reduction module 16 and the 0.4 mm diameter nozzle described above is removed. A pipe cross 50 is attached to the entrance end of the body of the spectrometer as shown in FIG. 7. The pipe cross provides a fixture to align the ¼" heated metal transfer tube with the bore of the spectrometer so that ion-laden gas flowing from the charge-reduction module 16 is aimed at the center rod. 50 and also provides a means to introduce drift gas, such as air, $N_2$, or Ar. A bundle of ¼" diameter low-straightening tubes is inserted into the body of the spectrometer to provide a laminar flow of drift gas. In this embodiment, flow from the charge-reduction module combines with gas drawn through the flow straightening tubes under flow conditions that maintain a laminar flow of ion-laden gas with a laminar flow of drift gas. As the ions approach the center rod, voltage applied to the center rod disperses the ions through the surrounding drift gas towards a detector ring(s) 53 positioned on the inside wall of the spectrometer. Ion signals are collected on the detector ring(s) during a time that voltage is applied to the center rod. The voltage applied to the center rod can be a constant voltage, as described above, or a ramped voltage. While a rising ramped voltage is applied to the center rod, small ions are detected before larger ions because a higher voltage is needed to steer larger ions onto a detector ring. Ramping the voltage provides a way to record an ion mobility spectrum.

Figure 8:
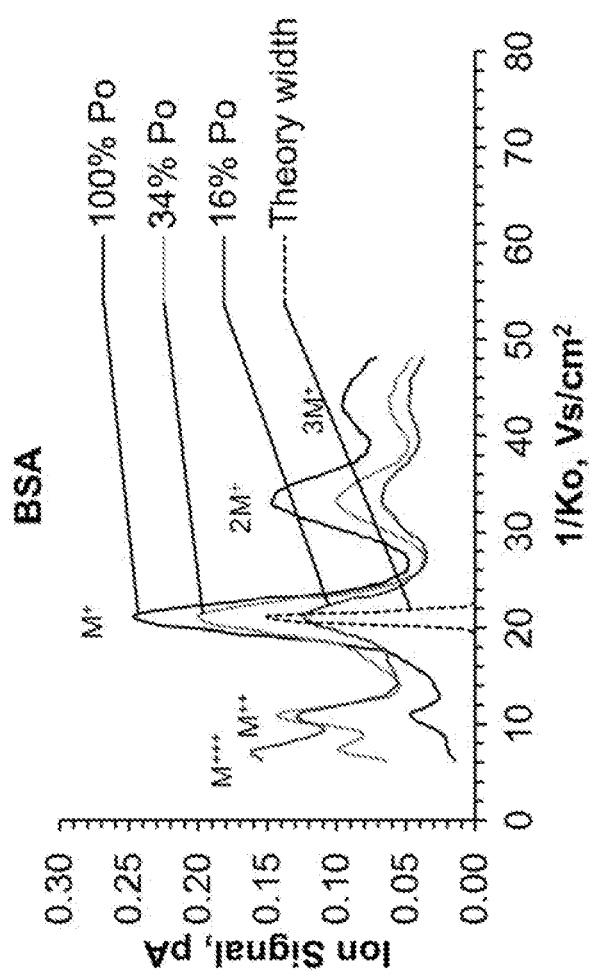
FIG. 8 is a plot of ion mobility spectrum for bovine serum albumin (BSA) a 0.25 mg/mL.

Examples of an ion mobility spectrum are presented in FIG. 8 for bovine serum albumin (BS) at 0.25 mg/mL. The spectra were generated by ramping the voltage applied to the center rod from 0 to 4 kV. The charge-reduction process was controlled by placing apertures between the charge-reducing polonium source and the electrospray plume of droplets. Ion signal intensity in picoamps is plotted vs. $1/Ko$ so that the x-axis relates to ion size since Ko is inversely proportion to ion size when ion charge is invariant. Ko is the ion mobility constant for an ion defined as v/E, where v=ion velocity and E=electric field. A plot of the theoretical resolution of the instrument derived from the Simion software simulations, is inserted into the $M^+$ peak. The 100, 34, and 16 percentage values in the legend correspond to no aperture, a 34 percent transmitting aperture and a 16 percent transmitting aperture, respectively, that blocked alpha particles released by the sealed Po source. The peak at $1/Ko=21.59$ represents the modal mobility of monomeric ions of BSA, i.e., $M^+$ ions and the width of the peak provides an estimate of the magnitude of the variation for conformations of BSA in this sample. Peaks at $1/Ko$ equal to 7.67, 11.21, 33.7 and 44.32 correspond to $M^{3+}$, $M^{2+}$, $M^+$, $2 M^+$ and $3 M^+$ ions, respectively.

The ring electrodes are cylinders of metal, such as a 2 mm long, 4.8 cm diameter cylinder of 0.020" thick copper. The electrode cylinders are positioned inside a larger diameter metal tube, such as a 50 cm long, 5.0 cm id metal tube. The ring electrodes are electrically isolated from the larger diameter tube using Teflon film as a liner inside the larger tube. The Teflon film provides electrical isolation. The Teflon film also minimizes generation of triboelectricity when the ring electrode vibrates while in contact with the Teflon film. Small vibrations from a laboratory room environment cause the ring electrodes to rub against the Teflon film. Teflon has material properties that produce minimal triboelectricity that could be conducted to an amplifier connected to the ring electrodes. Minimizing triboelectricity in this way lowers the background signal outputted by the amplifier and thus increases the sensitivity of the measurement technique because the background signal is small.

In a second embodiment for the ring electrodes, ring electrodes are inserted into a half-tube. A half-tube is formed by cutting a tube in half along its centerline. Half-ring electrodes are inserted along the length of the half-tube. Two half-tubes, after reassembled to form a tube, comprise an electrode ring assembly. The electrode assembly resides inside the body of the spectrometer 20.

Wires connected to each of the copper strips comprising ring electrodes or ring electrode assemblies, conduct ion currents to sensitive preamps that generate an output voltage proportional to the ion current. From knowledge of gas pressure, jet velocity, voltage applied to the center rod and the dimensions of the spectrometer, it is possible to determine optimal locations for the ring electrodes. After the ring electrodes are optimally positioned, it is possible to detect specific ions in a sample. For example, an optimal location for ring electrode 1 will be useful for detecting antibody light chains fragments. Ring electrode 2 located farther in to the body of the spectrometer will be useful for detecting antibody heavy chains. Ring electrode 3 located further into the body of the spectrometer will be useful for detecting antibody ions. Ring electrode 4 located the farthest into the body of the spectrometer will be useful for detecting agglomerated antibody ions such as the dimeric form of an antibody. This design based on four ring electrodes provides a way to detect these four components simultaneously.

Figure 2C:
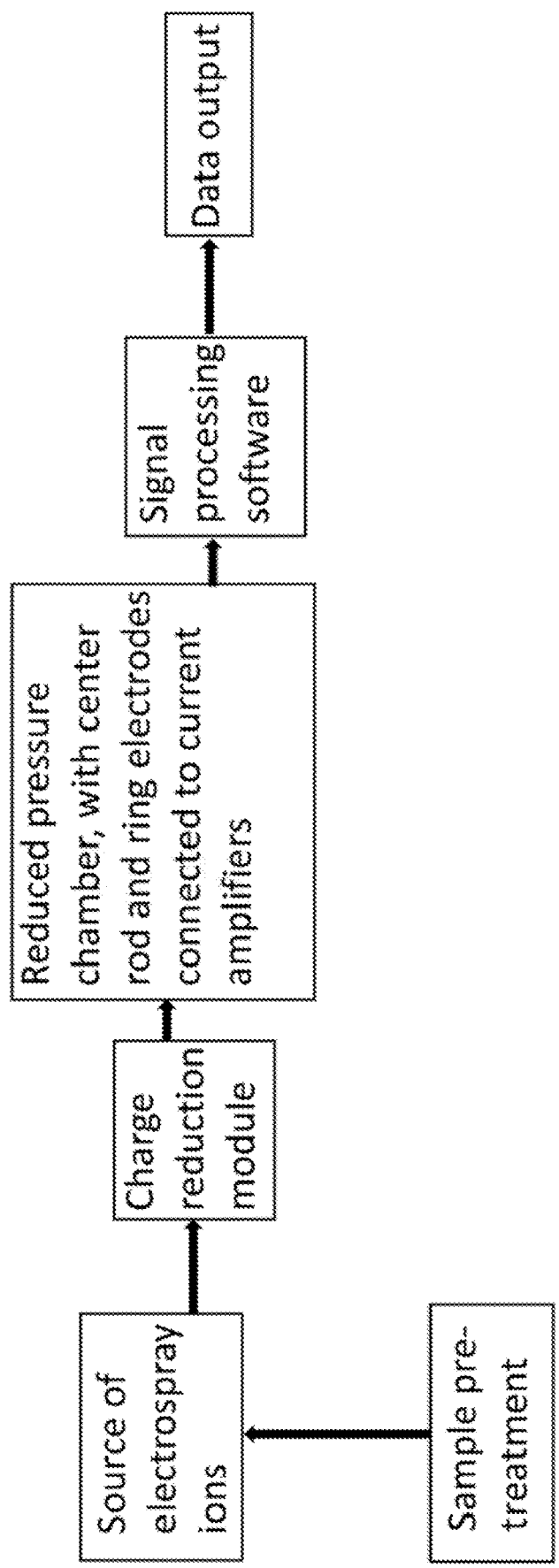
FIG. 2C is a block diagram of a system utilizing sample pre-treatment.
Figure 3:
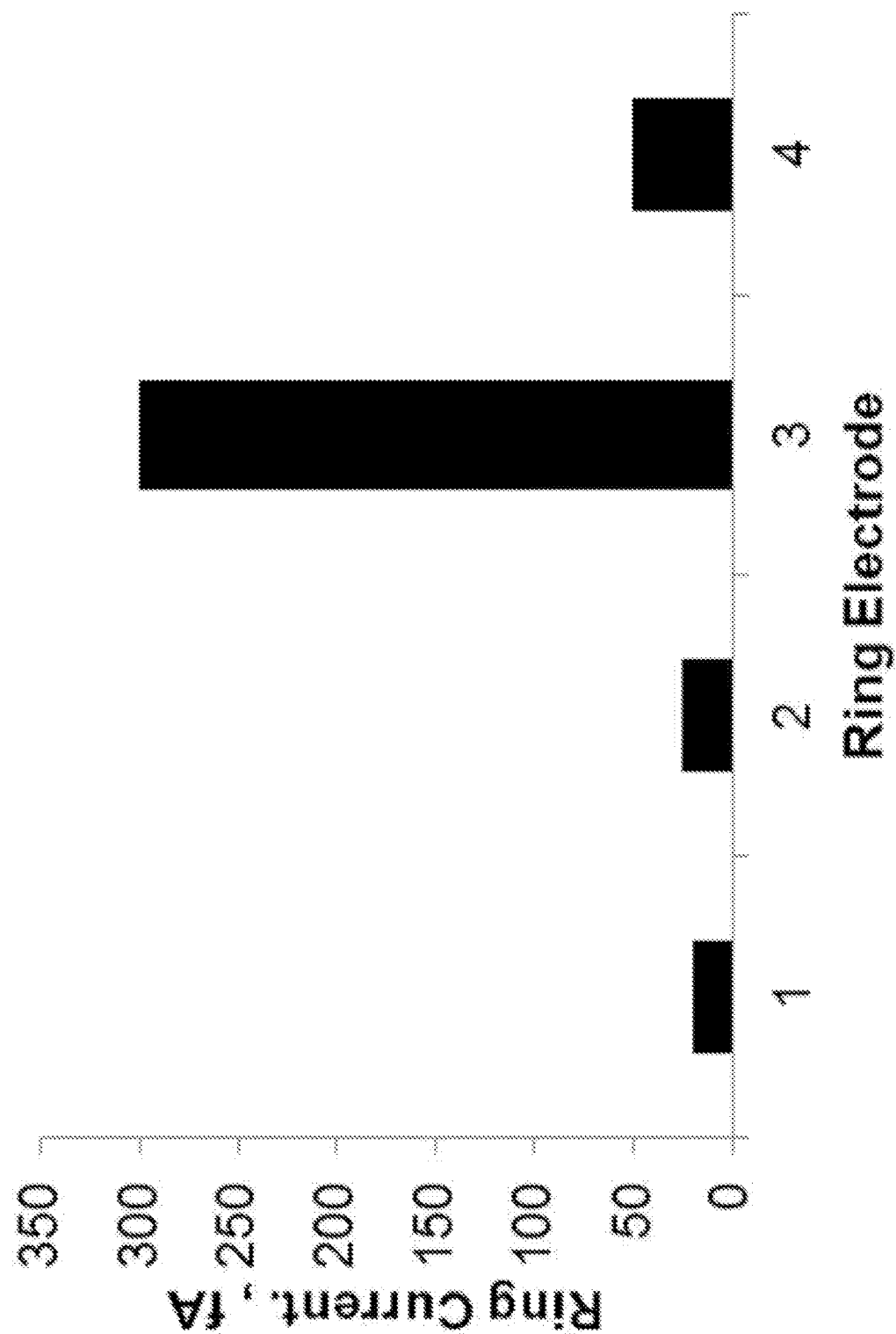
FIG. 3 illustrates the type of data that is generated with the apparatus where the height of the bars represents the magnitude of a current generated as ions hit the ring electrodes continuously while a constant voltage is applied to the center rod.

FIG. 3 illustrates the type of data that is generated with the apparatus while a constant voltage is applied to the center rod. The bars in this plot represent the magnitude of the ion current generated by ions of an antibody light chain (detected by ring electrode 1), ions of antibody heavy chain (detected by ring electrode 2), ions of antibody monomer (detected by ring electrode 3) and ions of an aggregated antibody (ring electrode 4). The data illustrated in FIG. 3 represents detector signals for applying a fixed voltage to the center rod in the apparatus depicted in FIG. 2. In FIG. 3, the height of the bars represents the magnitude of a current generated as ions hit the ring electrodes continuously, Ring 3 shows a current signal that is much greater than the current signals produced by the other three electrodes. In this illustration, the current measured on ring 3 represents the concentration of monomeric antibody in the sample. The concentration of light chains, heavy chains and dimeric antibodies is lower as indicated by the height of the bars for rings 2, 3 and 4 compared to the height of the bar for ring 3.

The present technology is not limited to detecting ions with 4 ring electrodes. The present technology can be equipped with numerous closely-spaced ring electrodes, such as but not limited to 1000 ring electrodes. The number of ring electrodes is limited only by physical constraints, such as the width of each ring electrode and the spacing between each electrode. For example, it is theoretically possible to design a spectrometer with 1 mm thick ring electrodes having a half mm insulated spacing between each electrode. A further limitation of designing a spectrometer with as many or more than 1000 ring electrodes is the cost associated with operating each ring electrode with a low noise amplifier.

Important features of the present technology should be noted. The ion jet is aimed at the center rod. A voltage is applied to the center rod to prevent ions from hitting the it. An electric field established between the rod and the surrounding grounded tube repels ions towards the wall of the tube. Cylindrical ring electrodes located radially between the center rod and the wall, but near to the wall, capture ions deflected by the voltage applied to the center rod. Ring electrodes are connected to current amplifiers that respond to the rate ions strike the ring electrodes. Ring electrodes can be optimally located to detect specific ions. The location can be determined experimentally or by calculations using geometry factors, gas pressure, and voltages. A large number of ring electrodes is one possible design, Voltage can be applied to selected ring electrodes and the voltage establishes ion focusing conditions for improving signal resolution and ion transport efficiency. The apparatus can operate m reverse geometry in which a voltage is applied to one or more of the ring electrodes and then the ion current deposited onto the center rod is measured. Voltage applied to the center rod can be static and ions of known mobility are deposited on specific ring electrodes. A few ring electrodes can be implemented and the voltage applied to the center rod can be scanned. For the design in which a static voltage is applied to the center rod, several different ions can be detected simultaneously.

An intermediate design uses about 100 ring electrodes, for practical purposes, and then ions of specific CSA will be registered among a few of the ring electrodes. For example, the antibody light chain ions may be detected on electrodes 10-15, antibody heavy chain ions may be detected on optimally located ring electrodes. Optimal location refers to an ion landing location that can be calculated from knowledge of electric field strength, the length between the centered rod and the wall of the spectrometer, ion size and gas pressure and temperature.

Figure 4:
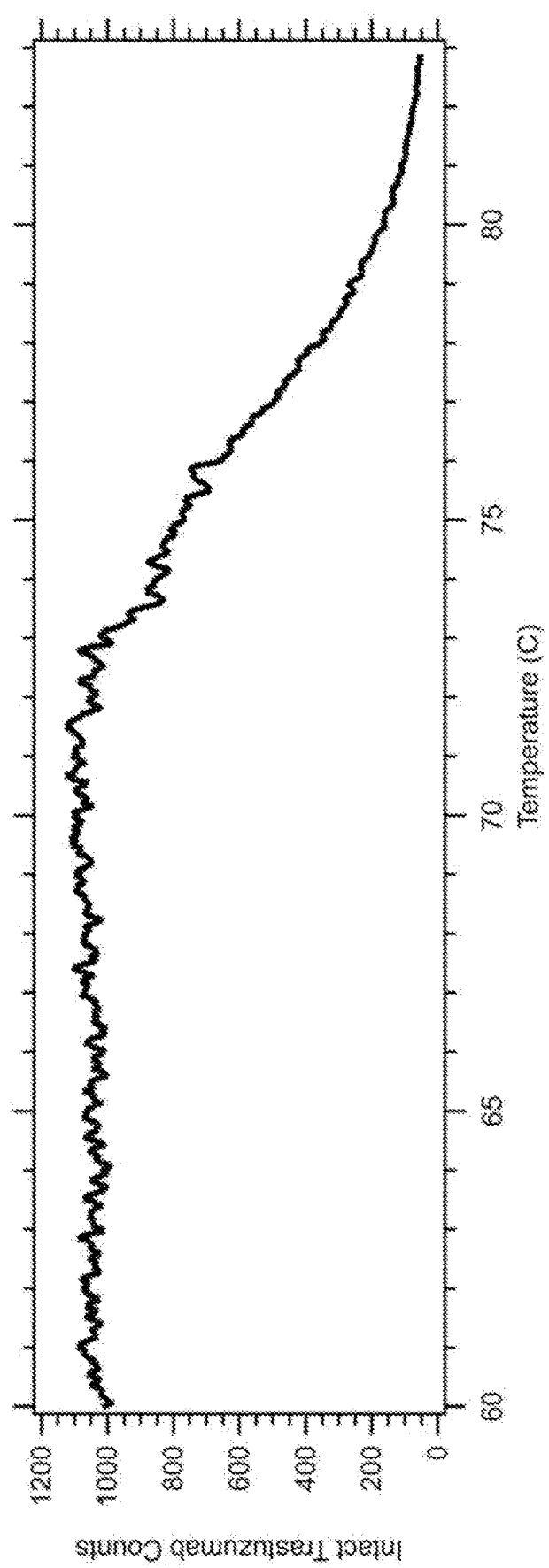
FIG. 4 shows item count rate vs. temperature for trastuzumab as it was subjected to a 20 min temperature ramp from 25 to 100 deg C.
Figure 5:
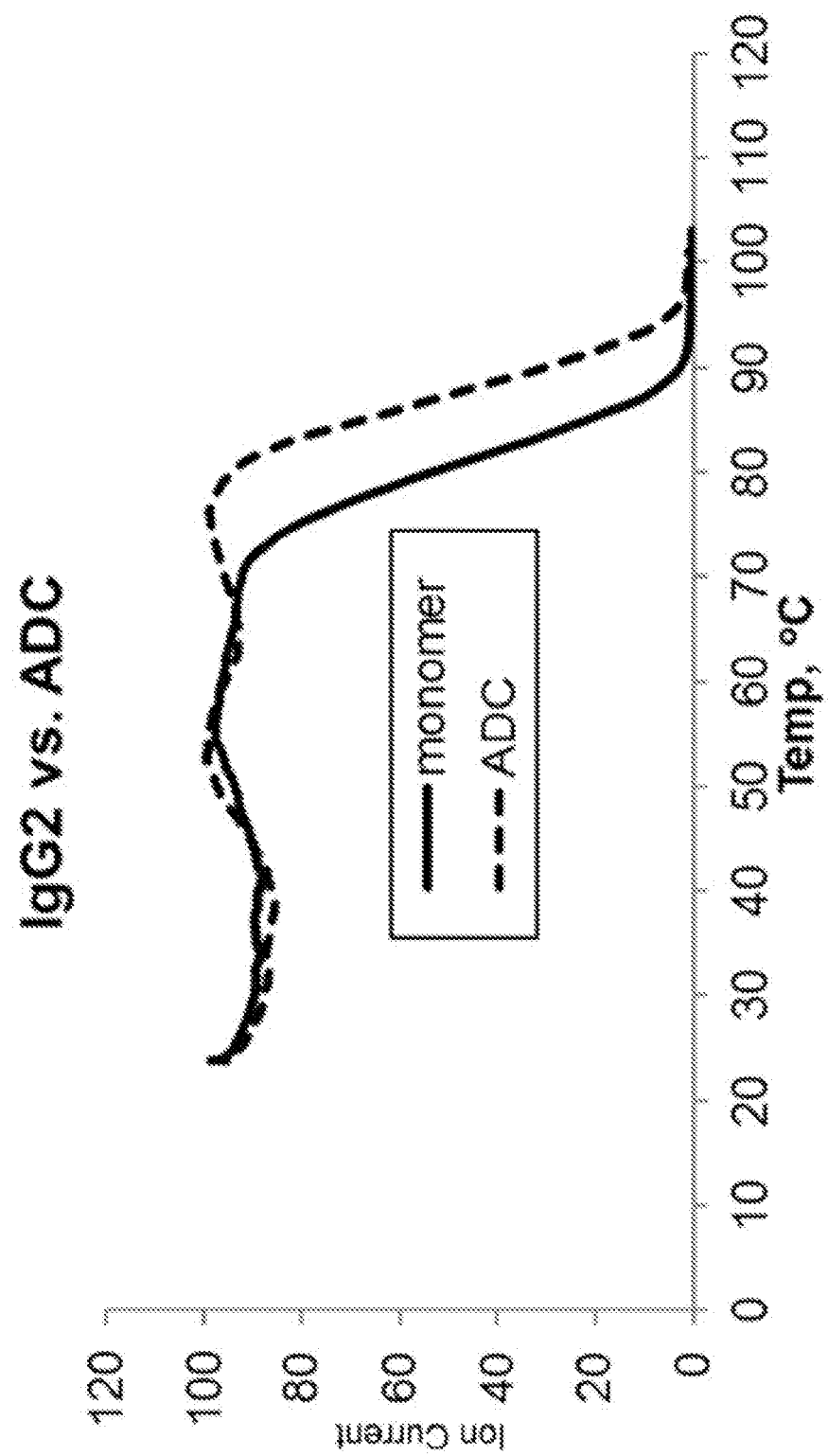
FIG. 5 shows ion count rate vs. temperature for an IgG2 antibody and an IgG2 antibody drug conjugate as they were subjected independently to 20 min temperature ramps from 25 to 100 deg C.
Figure 6:
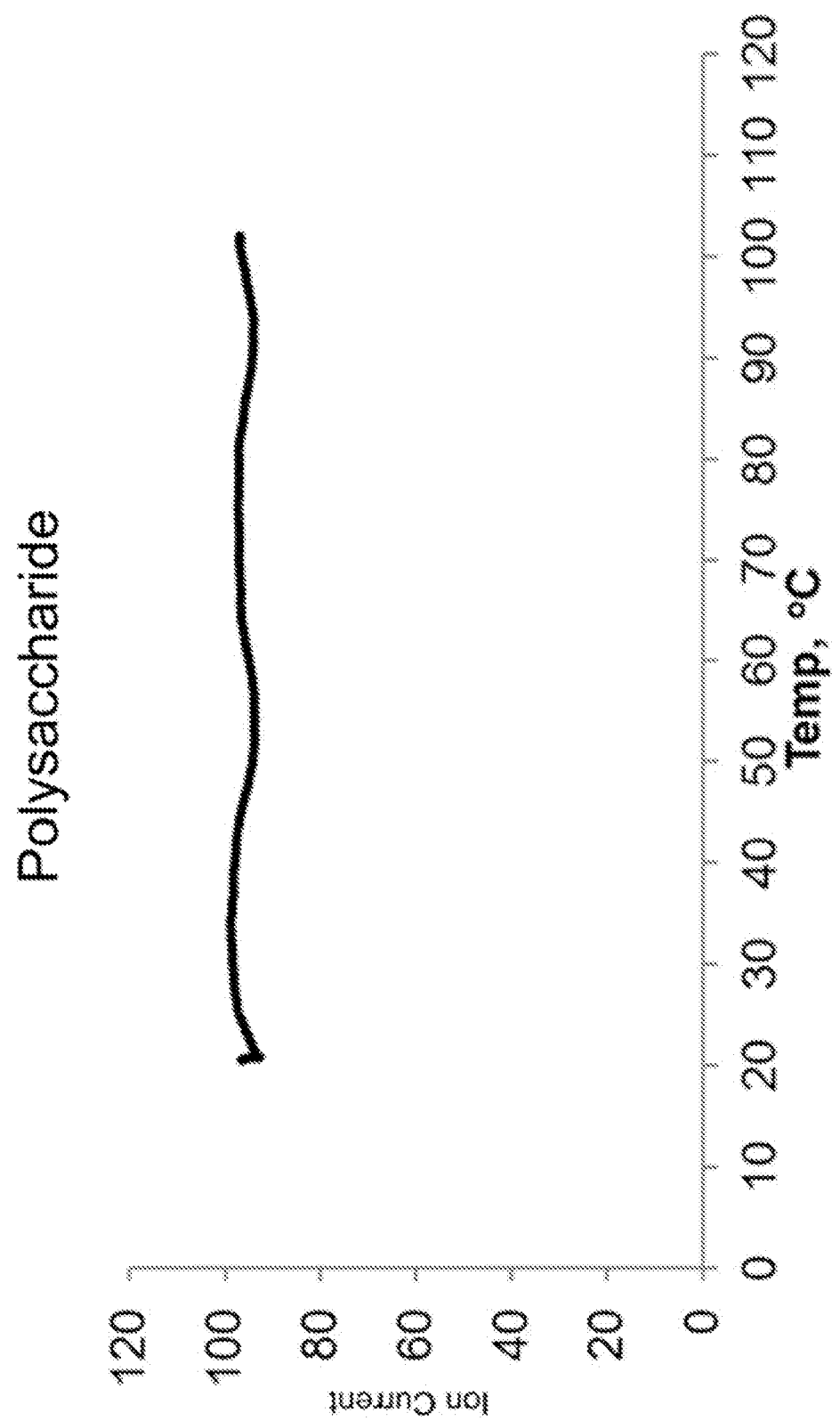
FIG. 6 shows ion count rate vs. temperature for a polysaccharide as it was subjected to a 20 min temperature ramp from 25 to 100 deg C.

FIGS. 4-6 illustrate the operation of the spectrometer with a sample heater. As the liquid sample is pumped through an electrospray capillary, a tube heater surrounds a length of the capillary and heats the capillary from room temperature to 100 C. A temperature controller attached to the heater controls the temperature so that a ramped temperature is generated. The type of ramped temperature used in these examples is a linearly ramped heating rate that produces a linear rise in temperature, rising from room temperature to 100 C. Optional heating rates are additionally possible, such as a 10 min ramp starting, at 50 C and rising linearly to 100 C. While the temperature of the sample is rising, the ion current is monitored with one of more ring electrodes in the present technology. If several ring electrodes are incorporated into the design of the spectrometer, ion currents generated by ions striking the ring electrodes can he monitored simultaneously. In these figures the voltage applied to the center rod was constant.

Ion current vs. the concentration of trastuzumab is illustrated in FIG. 4. Ion current vs. the concentration of an IgG drug is represented with a solid line in FIG. 5. FIG. 5 also shows the ion current vs. temperature for the same antibody but after a drug has been chemically attached to the antibody—a form of the antibody called an antibody drug conjugate (ADC). Ion current vs. the concentration of a polysaccharide is illustrated in FIG. 6.

Thus, FIG. 4 shows ion current vs. temperature for trastuzumab as it was subjected to a 20 min temperature ramp from 25 to 100 deg C. FIG. 5 shows ion current vs. temperature for an IgG2 antibody and an IgG2 antibody drug conjugate as they were subjected independently to 20 min temperature ramps from 25 to 100 deg C. FIG. 6 shows ion count rate vs. temperature for a polysaccharide as it was subjected to a 20 min temperature ramp from 25 to 100 deg C.

The shape of the curves in FIGS. 4-6 and FIG. 8 are useful for determining properties about the substances that were analyzed. FIGS. 4 and 5 show substances that were sensitive to heat. The signal from these substances disappeared after they were heated to approx. 70 C, as evidenced by a drop in the signal after a temperature near 70 C was reached. FIG. 6 shows an example of a substance that is not thermally stable. It did not disintegrate as it was heated to 100 C. suggesting that this material is thermally stable up to 100 C. FIG. 8 shows the distribution of the sizes of different BSA ions.

The embodiments of the spectrometers presented in FIG. 2A and FIG. 7 provide features that enable the determination of values of Ko (ion mobility constant) for substances such as electrosprayed proteins. While an embodiment of a spectrometer, such as one presented in FIG. 2A, is operated in fixed-voltage mode, the concentration of ions in a sample can be obtained by recording the ion current on one or more detector rings simultaneously. The benefit to the analyst of this mode of operation is signal averaging. The recorded ion current can be averaged over long times to increase the signal to noise ratio for the purpose of obtaining more accurate measurements and for obtaining values for ions that are present in low abundance. This mode of operation is important for process monitoring because the production of contaminants can be monitored simultaneously with product monitoring assuming that the product generates ions that land on one ring while contaminant ions land on a separate ring.

The embodiments in FIG. 2A and FIG. 7 provide benefits of operation at reduced pressure or operation at atmospheric pressure. Reduced pressure helps to remove solvent from the ions—i.e., leads to rapid production of anhydrous ions. Reduced pressure operation also serves to diminish the voltage required to deflect ions of a specific size onto a detector ring. At reduced pressure, less voltage is required to deflect an ion of a given size onto a detector ring compared to operation at atmospheric pressure which increases the aerodynamic drag on an ion, thus requiring higher voltage to deflect it onto the same detector ring.

Many literature articles describe the determination of Ko for specific ions at reduced pressure, such as 4 torr. Using the embodiment of a spectrometer shown in FIG. 2A, Ko values can be determined at reduced pressure, such as 4 torr, for the purpose of comparing our data to published values. Not only is the option to determine Ko values at reduced pressure important, it is also important to determine Ko values in different drift gasses. The embodiment in FIG. 7 provides a way to make measurements in different drift gasses. Drift gases such as $N_2$, Ar, and He are commonly tested by researchers in the field of ion mobility spectrometry. The embodiment in FIG. 7 can be provided with different drift gasses by introducing them into the spectrometer through connection to 50.

Ion mobility spectrometers are commonly calibrated by analyzing calibration materials, such as standard compounds and well-characterized proteins. The designs of the spectrometers in FIG. 2A and FIG. 7 are based on relatively simple physical concepts that have allowed us to simulate the trajectories of ions exposed to the electric and flow conditions of the spectrometer. These simple designs have allowed us to simulated accurately Ko values for ions that land on a detector ring as related to voltage applied to the center rod. In this regard it is possible to determine Ko values for substances without the need to calibrate the spectrometer through rigorous analysis of calibration substances. This approach has provided a way to obtain Ko values based on first principles of physics in which dimensions of the spectrometer, gas flow rate, voltage, gas composition and pressure are known and can he used to determine Ko directly.

Knowledge of the flow of gas in ion mobility spectrometers is important to consider, particularly when flows are combined. The embodiments presented in FIG. 2A and FIG. 7 are based on relatively simple gas flows. In FIG. 2A a jet of ion-laden air is introduced as a well-defined jet, i.e., a jet that is not oscillating, not swirling and narrowly focused. The gas flow associated with the design in FIG. 7, relies on combining two laminar flows that are well-characterized by commonly used equations in the field of fluid dynamics. The embodiments described here repel ions away from the center rod in a manner that never allows the ions to interact with distortions in the gas boundary layer that are introduced by several design for center rods. This reduces the requirement for conducting a thin sheath flow of gas flow surrounding the center rod as is needed in prior art, The physical size of the embodiments described in FIG. 2A and FIG. 7 are approximately 10×10×20 cm (LWH) or approximately 100 times smaller than a commercially available instrument. The size provides ease of operation, maintenance and usage in bench-top laboratory operations. The embodiments we evaluated were based on a body for the spectrometer that was 50 mm in diameter. The performance of these embodiments will not be impacted if the diameter of the spectrometer is reduced to 25 mm or expanded to 100 mm. The current embodiment is partially optimized for gas flow rate, ion-laden gas flow rate, operating pressure(s) and range of voltages applied to the center rod that require minimum pumping and safety considerations I terms of high voltage usage.

Figure 9:
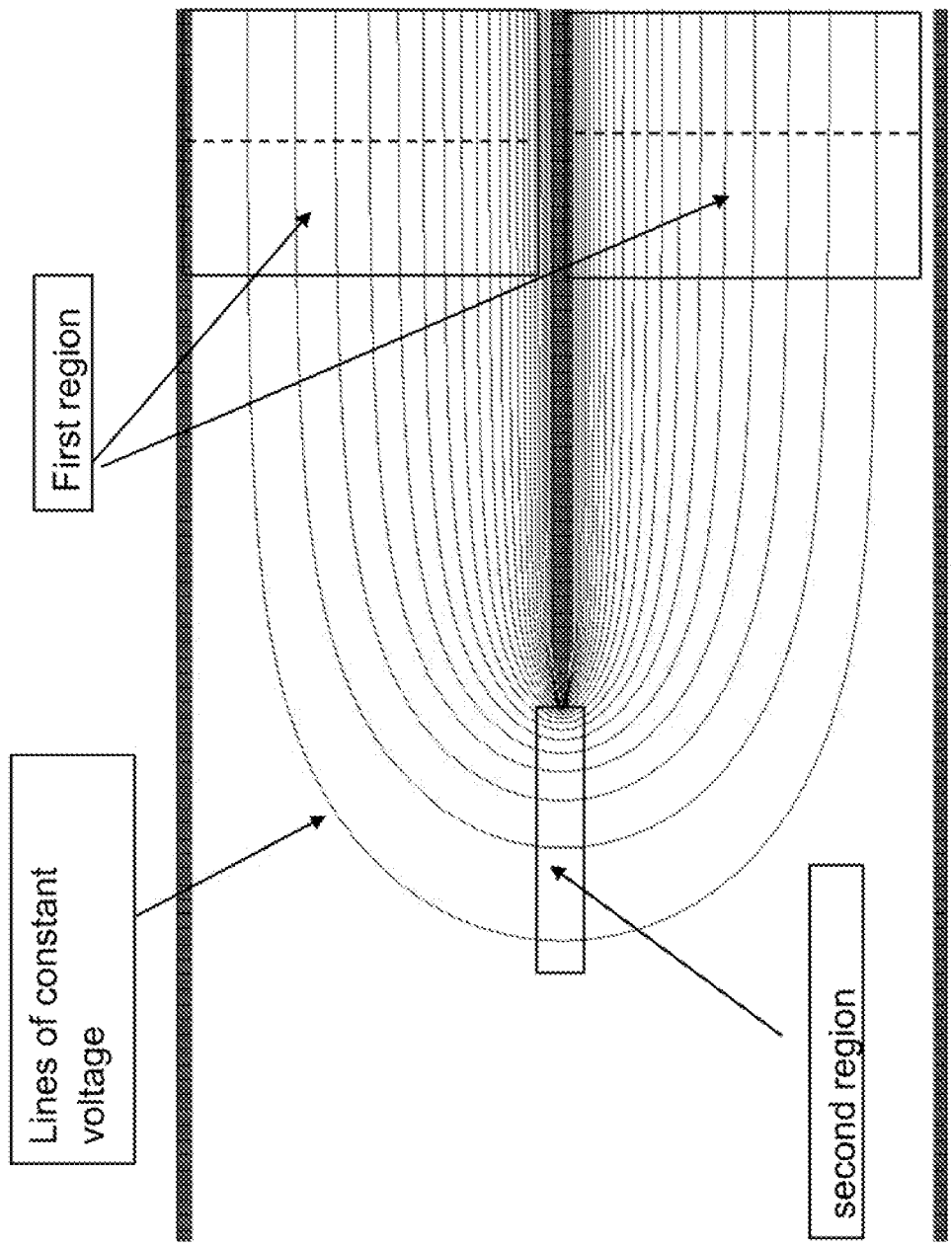
FIG. 9 shows lines of constant voltage surrounding the center rod.

FIG. 9 shows lines of constant voltage surrounding the center rod. Lines of constant voltage drawn farther apart from each other represent a region of lower electric field and lines drawn closer together represent a higher electric field. Lines drawn near to the center rod can be seen to be closer together and therefore show that the electric field near to the center rod is higher than the electric field in regions farther away from the center rod in a first region (FIG. 9), located distally at least one radius from the tip of the center rod, the local electric field is defined by $E=K1*CRV/r$ where E=electric field in volts/cm, CRV is voltage applied to the center rod and r is the radial distance in cm from the center rod. $K1=0.29$ for a preferred embodiment described here. K is greater than 0.01 and less than 10 for all functioning embodiments. It can be understood that the first region extends along the entirety of center rod in the direction away from the tip. The downward curving line in FIG. 10 can he understood to represent a log declining electric field.

The electric field in a second region (FIG. 9) locates proximally to the tip of the center rod is $E=K2*CRV/r$ where E=electric field in volts/cm, CRV is voltage applied to the center rod and r is the distance in cm directly in front of the tip of the center rod. $K2=0.158$ for a preferred embodiment described here and K is greater than 0.01 and less than 1 for all functioning embodiments. In regions between a first region and a second region, K values in E=K*CRV/r will fall between K1 and K2.

Figure 10:
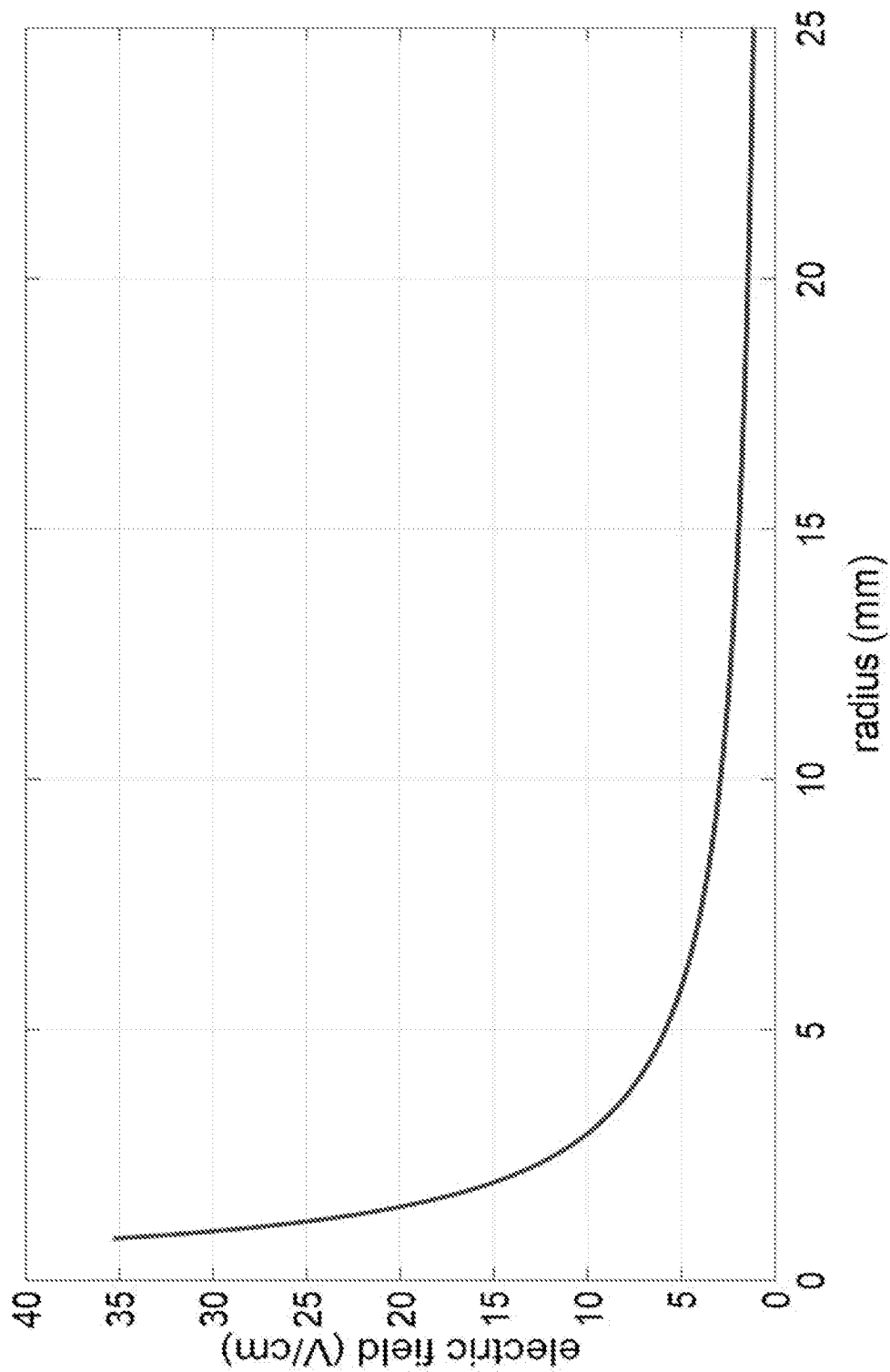
FIG. 10 shows electric field in the first region of FIG. 9 along a radius of the body of the spectrometer when 1000 volts is applied to the center rod.
Figure 11:
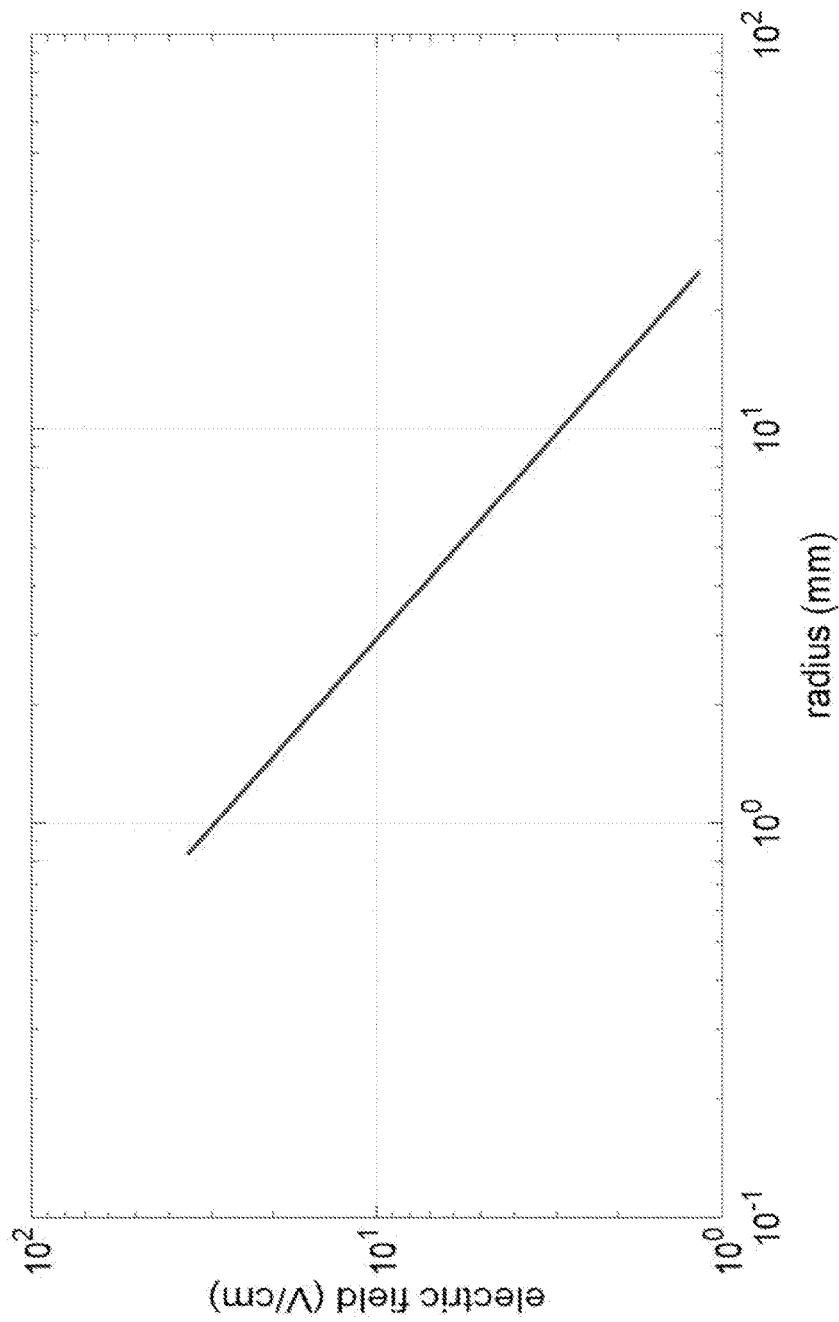
FIG. 11 shows the logarithmic relationship between electric field and radial position.

FIG. 10 shows electric field in the first region of FIG. 9 along a radius (dashed line) of the body of the spectrometer when 1000 volts is applied to the center rod. When this data is replotted on log-log axes (FIG. 11), a straight line substantiates the logarithmic relationship between voltage and radial position and can be understood furthermore to represent a logarithmic relationship between electric field and radial position.

Figure 12:
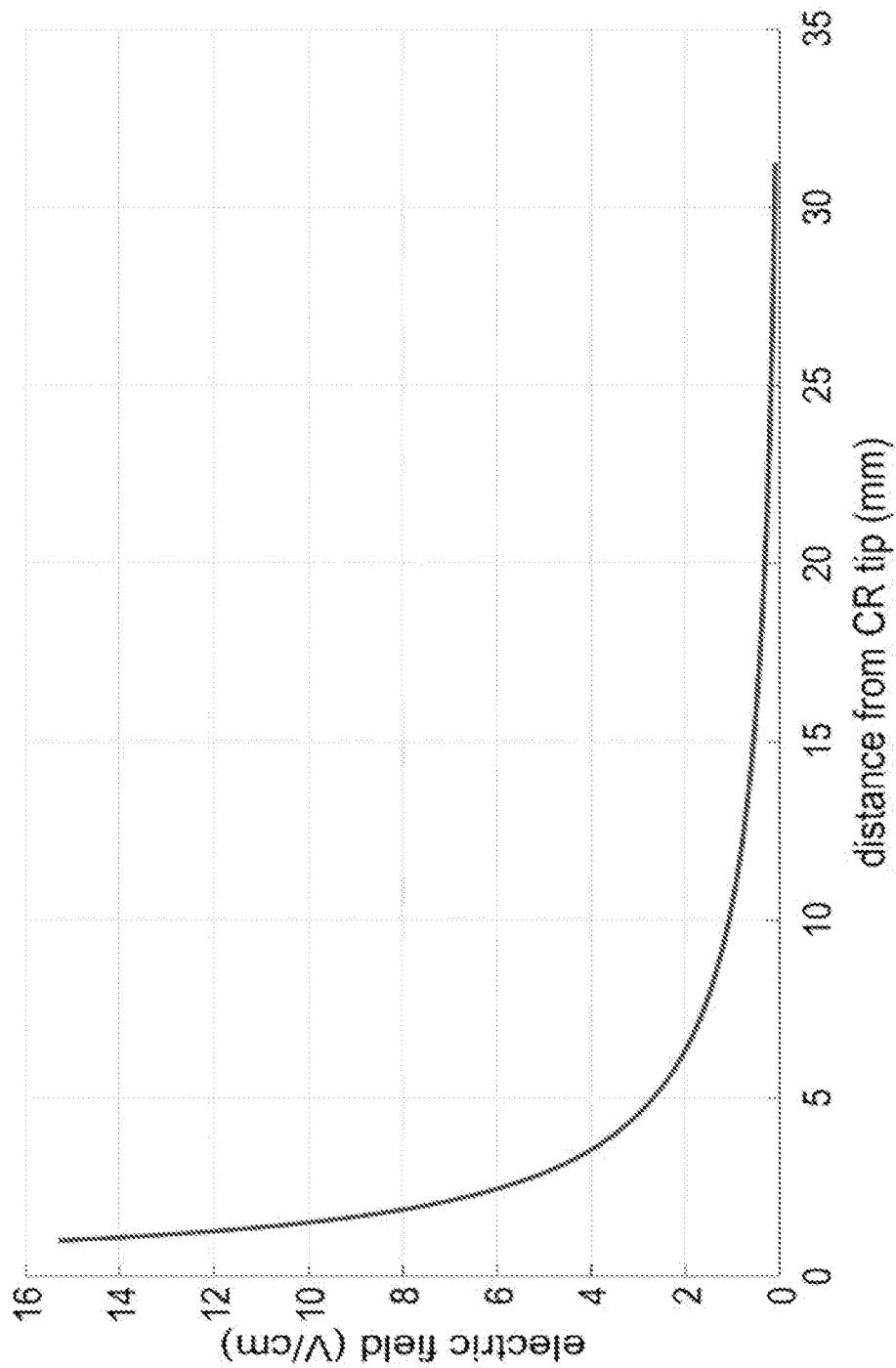
FIG. 12 shows the electric field in the first region of FIG. 9 along a radius of the body of the spectrometer when 1000 volts is applied to the center rod.
Figure 13:
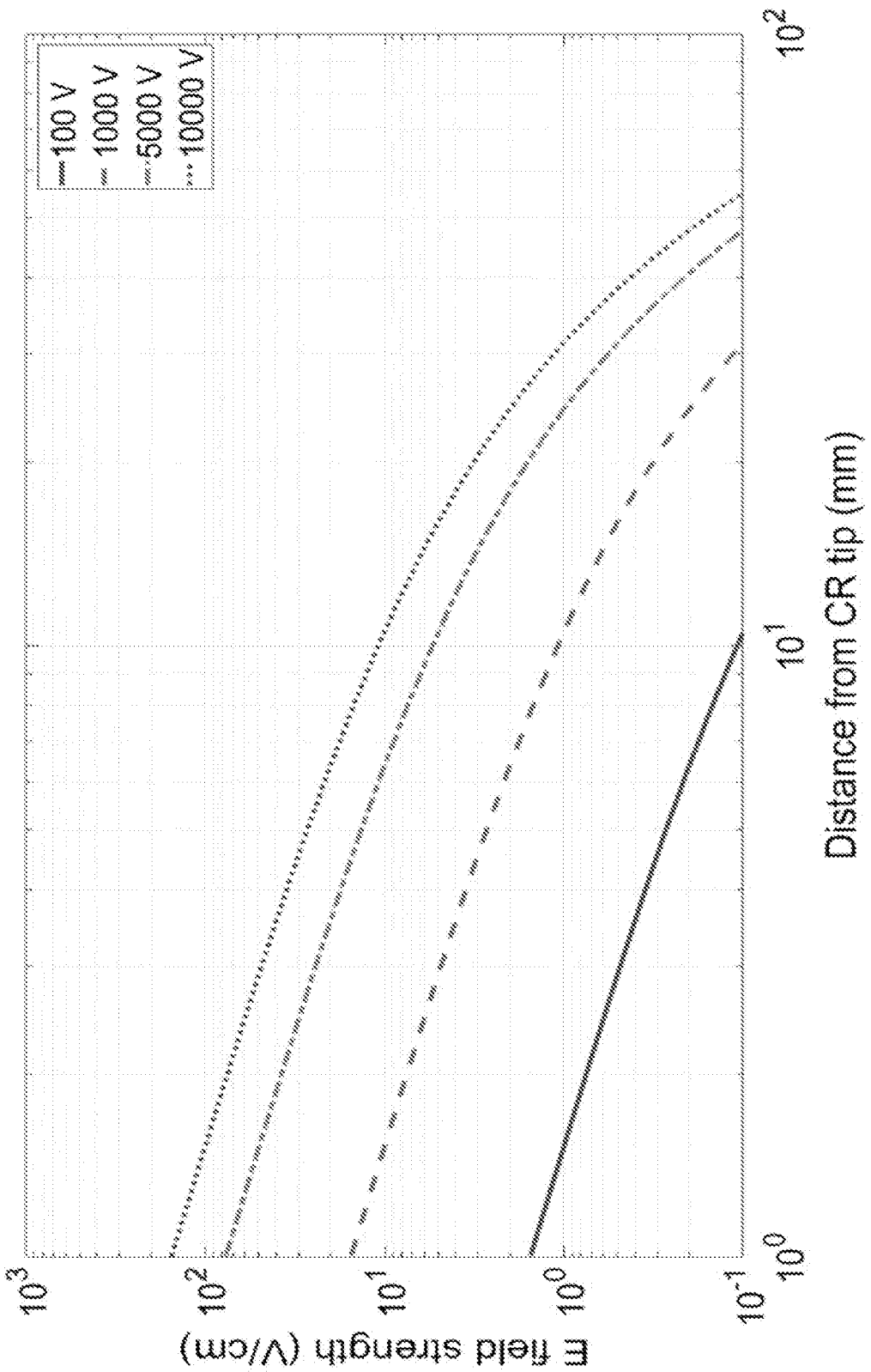
FIG. 13 is a log-log plot of voltage vs radial position along a line in the second region of FIG. 9 extending proximally from the tip of the center rod when 100, 1000, 5000 or 10,000 volts are applied to the center rod.

FIG. 12 shows the electric field in the first region of FIG. 9 along a radius of the body of the spectrometer when 1000 volts is applied to the center rod. A log-log plot in FIG. 13 of voltage vs radial position along a line in region 2 of FIG. 9 extending proximally from the tip of the center rod when 100, 1000, 5000 or 10,000 volts are applied to the center rod. At applied voltages less than about 1000 V the plots are linear indicating the electric field is logarithmic. For voltages between 1000 V and 10,000 curvature of the lines indicates the electric field decays faster than logarithmically and produces a steeper, and thus more effective, electric field for steering ions away from the tip of the center rod.

Figure 14:
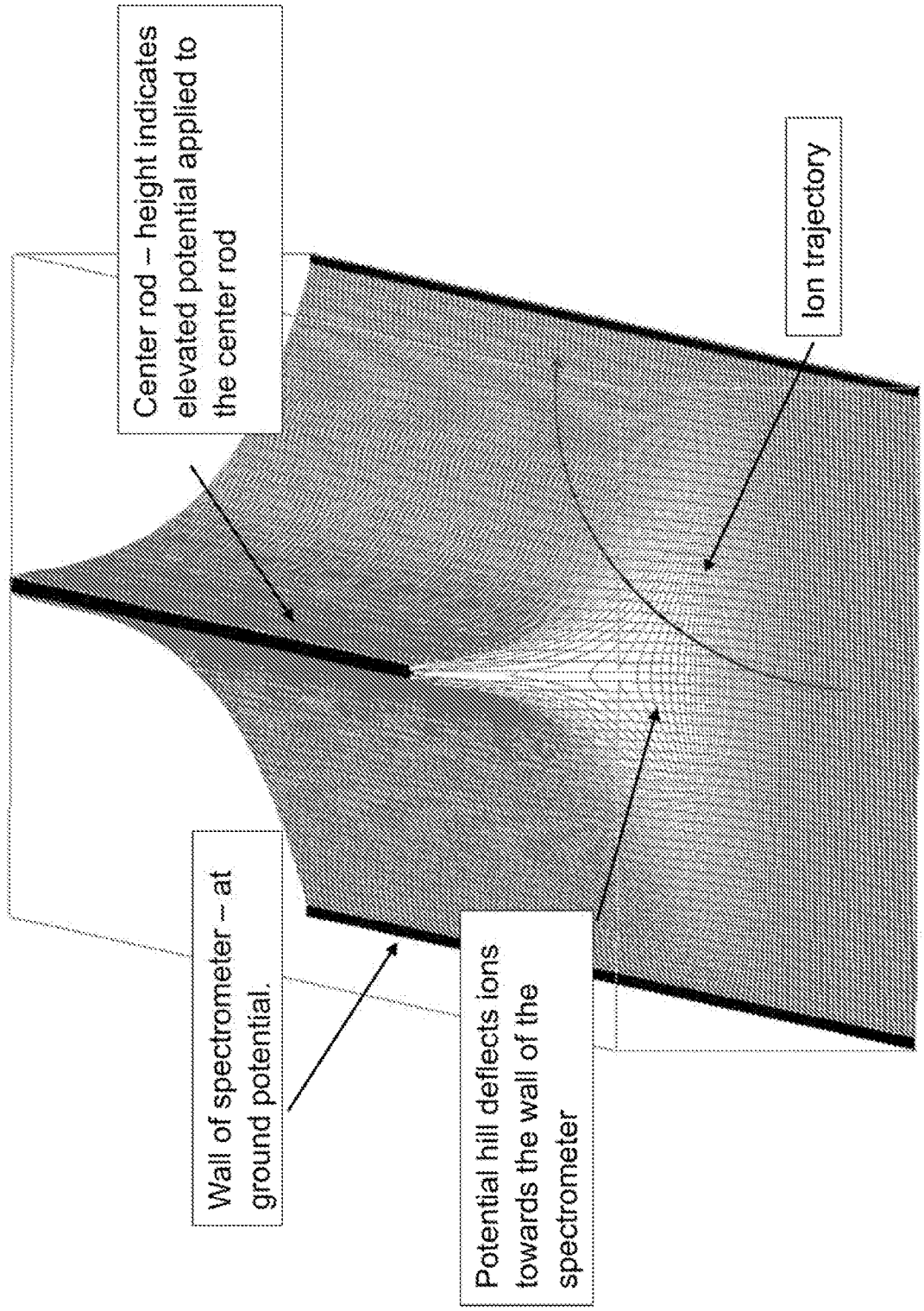
FIG. 14 is an example of an ion trajectory drawn over a potential hill created by voltage applied to the center rod.

FIG. 14 is an example of an ion trajectory drawn over a potential hill created by voltage applied to the center rod. The curved line represents a trajectory for an ion approaching the tip of the center rod. The arrow on the line represents direction of travel. As an ion approaches the tip of the center rod, voltage applied to the center rod creates an electric field that deflects the ion radially. The strength and shape of the electric field steers the ion(s) away from the center rod, thus precluding the necessity for a centered flow of clean air along the center rod as is provided in prior art to prevent effects of a stagnant boundary of gas flow near to the surface of the center rod.

Broadly, this writing discloses at least the following.

Apparatuses and methods are described for determining properties of ions travelling through a gas under the influence of an electric field. The apparatuses and methods can be understood to provide measurements of the electrical mobility of ions as useful for determining the electrical mobility constant Ko of electrosprayed substances, such as proteins. The apparatuses and methods relate to the scientific discipline of ion mobility spectrometry, Modules connected to ion mobility spectrometers provide stress to substances for the purpose of investigating, for example, the thermal stability of proteins. One form of the technology includes a tubular spectrometer body having an electrically conductive inner wall; a rod positioned along the longitudinal center of the body and electrodes positioned on, but electrically isolated from the inner wall, where the ratio of the radius of the tubular spectrometer body to the radius of the rod is at least 20.

This writing also presents is at least the following Concepts.

Concepts:

1. An apparatus, comprising:

a tubular spectrometer body having are electrically conductive inner wall;

a rod positioned along the longitudinal center of said tubular spectrometer body; and one or more ring electrodes positioned on, but electrically isolated from, said inner wall, wherein the ratio of the radius of said tubular spectrometer body to the radius of said rod is at least 20.

2. The apparatus at concepts 1, 3-10, 12-15 and 17-29, wherein the ratio of the radius of said tube to the ratio of the radius of said rod is within a range from 20 to 10000.

3. The apparatus of concepts 1, 2, 5, 8-10, 12-15 and 17-29, further comprising means for applying a voltage between said rod and said inner wall.

4. The apparatus of concept 3, wherein said voltage is a ramped voltage.

5. The apparatus of concepts 14 and 6-29, further comprising means for flowing gas through said spectrometer body.

6. The apparatus of concept 5, wherein said gas comprises on $N_2$.

7. The apparatus of concepts 5, wherein said gas comprise at least one of $N_2$, air, Ar, He, $SF_6$, $O_2$ and $CO_2$.

8. The apparatus of concepts 1-7 and 9-29, further comprising means for providing only two simultaneous gas flows through said spectrometer body, 9. The apparatus of concepts 1-8 and 10-29, further comprising means for generating and introducing gas-phase ions in a flow of gas into said spectrometer body.

10. The apparatus of concepts 1-9 and 11-29, further comprising means for reducing the pressure within said body.

11. The apparatus of concept 10, further comprising means for drawing ion-laden gas into said spectrometer body.

12. The apparatus of concepts 1-11 and 13-29, further comprising an electrically insulating material between said one or more ring, electrodes and said inner wall.

13. The apparatus of concepts 1-12 and 14-29, further comprising means for measuring an output voltage from at least one of said electrodes, wherein said output voltage is proportional to ion current.

14. The apparatus of concepts 1-13 and 15-29, wherein said electrodes are operatively positioned within said tube to detect specific ions.

15. The apparatus of concepts 1-14 and 16-29, further comprising means for applying as first voltage to one electrode and a second voltage to another electrode.

16. The apparatus of concept 3, wherein said means for applying a voltage is configured such that said ions will be repelled from said rod toward said one or more electrodes.

17. The apparatus of concepts 146 and 18-29, further comprising means for generating an ion mobility spectrum by recording an ion current.

18. The apparatus of concepts 1-17 and 19-29, further comprising means for generating an ion mobility spectrum by recording an ion current while voltage applied to said center rod is ramped.

19. The apparatus of concepts 1-18 and 20-29, further comprising means for differentiating M+, M++, M+++, 2 M+ and 3 M+ ions.

20. The apparatus of concepts 1-49 and 21-29, further comprising means fear generating an ion mobility spectrum in which the widths of the ion mobility peaks are used to determine the variation of the size of an ion.

21. The apparatus of concepts 1-20 and 22-29, further comprising means for generating an ion mobility spectrum by recording an ion current during the time the voltage applied to the center rod is ramped and the sample is heated.

22. The apparatus of concepts 1-21 and 23-29, further comprising means for determining the thermal stability of a substance by monitoring the ion current for the substance while the sample is heated.

23. The apparatus of concepts 1-22 and 24-29, further comprising means for determining the thermal stability of a substance by monitoring the ion current for the substance while the sample is exposed to visible light.

24. The apparatus of concepts 1-23 and 25-29, further comprising means for determining the thermal stability of a substance by monitoring the ion current for the substance while the sample is exposed to a denaturing substance.

25. The apparatus of concepts 1-24 and 26-29, further comprising the use of image recognition software and feedback control provide stable electrospray.

26. The apparatuses of concepts 1-25 and 27-29, further comprising a means for controlling the charge-reduction process by providing a physical restriction, such as an aperture, between the electrospray source and a polonium source.

27. The apparatuses of concepts 1-26, 28 and 29, further comprising a means for producing an electric field that decreases logarithmically in strength between a center rod and a surrounding cylindrical metal cylinder.

28. The apparatuses of concepts 1-27 and 29, father comprising a means for producing the body of the spectrometer as the combination of two half-pipes.

29. The apparatuses of concepts 1-28, further comprising a means for automated sample analysis.

30. A method, comprising:
providing a tubular spectrometer body having an electrically conductive inner wall;
providing a rod positioned along the longitudinal center of said tubular spectrometer body;
providing one or more ring electrodes positioned on, but electrically isolated from, said inner wall, wherein the ratio of the radius of said tubular spectrometer body to the radius of said rod is at least 20;
directing a flow of gas-phase ions into said spectrometer body while applying a voltage between said rod and said inner wall; and
measuring an output voltage from at least one of said electrodes.

31. The method of concepts 30 and 32-53, wherein the ratio of the radius of said tube to the ratio of the radius of said rod is within a range from 20 to 10,000.

32. The method of concepts 30, 31 and a33-53, wherein said voltage is a ramped voltage.

33. The method of concepts 30-32 and 36-53, further comprising flowing gas through said spectrometer body, wherein said gas-phase ions flow in said flowing gas.

34. The method of concept 33, wherein said gas comprises only $N_2$.

35. The method of concept 33, wherein said gas comprises at least one of $N_2$, air, Ar, He, $SF_6$, $O_2$ and $CO_2$.

36. The method of concepts 30-35 and 37-53, further providing only two simultaneous gas flows through said spectrometer body.

37. The method of concepts 30-36 and 39-53, further comprising reducing the pressure within said body, 38. The method of concept 37, further comprising drawing ion-laden gas into said spectrometer body.

39. The method of concepts 30-38 and 40-53, further comprising measuring an output voltage from at least one of said electrodes wherein said output voltage is proportional to ion current, 40. The method of concepts 30-39 and 41-53, wherein said electrodes operatively positioned within said tube to detect specific ions.

41. The method of concepts 1-40 and 42-53, further comprising applying a first voltage to one electrode and a second voltage to another electrode.

42. The method of concepts 30-41 and 43-53, wherein said voltage is applied such that said ions will be repelled from said rod toward said one or more electrodes.

43. The method of concepts 30-42 and 44-53, further comprising generating an ion mobility spectrum by recording an ion current determined from said output voltage.

44. The method of concepts 30-43 and 45-53, further comprising generating an ion mobility spectrum by recording an ion current determined from said output voltage while voltage applied to said center rod is ramped.

45. The method of concepts 30-44 and 46-53, further comprising differentiating M+, M++, M+++, 2 M+ and 3 M+ ions.

46. The method of concepts 30-45 and 47-53, further comprising generating an ion mobility spectrum from said output voltage and determining the variation of the size of an ion from the widths of the ion mobility peaks.

47. The method of concepts 30-46 and 48-53, further comprising generating an ion mobility spectrum from said output voltage by recording an ion current during the time said voltage applied to said center rod is ramped and a sample is heated.

48. The method of concepts 30-47 and 49-53, further comprising means for determining the thermal stability of a substance by monitoring the ion current for a substance while the sample is heated.

49. The method of concepts 30-48 and 50-53, further comprising determining the thermal stability of a substance by monitoring the ion current for the substance while the sample is exposed to visible light.

50. The method of concepts 30-49 and 51-53, further comprising determining the thermal stability of a substance by monitoring the ion current for the substance while the sample is exposed to a denaturing substance.

51. The method of concepts 30-50, 52 and 53, further comprising using image recognition software and feedback control to provide stable electrospray.

52. The method of concepts 30-51 and 53, further comprising a controlling a charge-reduction process by providing a physical restriction between an electrospray source and a polonium source.

53. The method of concepts 30-52, further comprising producing an electric field that decreases logarithmically in strength between said center rod and a surrounding cylindrical metal cylinder located within said tubular spectrometer body.

REFERENCES

U.S. Pat. No. 7,230,431

Bacher, C, W W Szymanski, S L Kaufman, P Zollner, D Blass and G Allmaier, Charge-reduced nano-electrospray ionization combined differential mobility analysis of peptides, proteins, glycoproteins, noncovalent proteins and viruses, J. Mass Spec, 36, 9, 1038-1052, 2001.

Bagal, D, J F Valliere-Douglass, A Balland and P D Schnier, Resolving disulfide bond structural isoforms of IgG2 monoclonal antibodies by ion mobility mass spectrometry, Anal. Chem., 82, 6751-6755, 2010.

Beck, A. et al., Analytical characterization of biosimilar antibodies and Fc-fusion proteins, Trends in Anal, Chem, 48, 81-95, 2013.

Benesch, J L P, B T Ruotolo, D A Simmons, et al., Protein complexes in the gas phase: technology for structural genomics and proteomics, Chemical Rev., 107, 3544-3567, 2007.

Berkowitz, S A, J R Engen, J R Mazzeo and G B Jones, Analytical tools for characterizing biopharmaceuticals and the implications for biosimilars, Nat. Rev., 11, 527-540, 2010.

Campuzano, I, et al., Structural characterization of drug-like compounds by ion mobility mass spectrometry: comparison of theoretical and experimentally derived nitrogen collision cross sections, Anal. Chem., 84, 1026-1033, 2012.

Chen, D R, D Y H Pui, Humines, H Fissan, F R Quant and G J Sem, Design and evaluation of a nanometer aerosol differential mobility analyzer (nDMA), J. Aerosol Sci., 29, 497-509, 1998.

Clemmer, D E and M F Jarrold, Ion mobility measurements and their applications to clusters and biomolecules, J. Mass Spectrum., 32, 577-592, 1997.

Cumeras, R, F Figueras, C E Davis, J I Baumbach and I. Gràcia, Review on ion mobility spectrometry. Part 1: current instrumentation, Analyst, 140, 1376, 2015.

Fernandez de la Mora, J, High-resolution mobility analysis of charge-reduced electrosprayed protein ions, Anal. Chem., 87, 3729-3735, 2015.

Fekete, S, A L Gassner, S Rudaz, J Schappler and D Guillarme, Analytical strategies for the characterization of therapeutic monoclonal antibodies, Trends in Anal. Chem., 42, 7483, 2013.

Freeke, J, et at, Gas-phase protein assemblies: Unfolding landscapes and preserving native-like structures using non-covalent adducts, Chem. Phys. Lett., 524, 1-9, 2012.

Gabrielson, J P and W F Weiss IV, Technical decision-making with higher-order structure data: starting a new dialog, J. Pharma. Sic., 104, 1240-1245, 2015.

Guha, S, M Li, M J Tarlov and M V Zachariah, Elearos-pray-differential mobility analysis of bionanoparticles, Trends in Biotechnology, 30,291-300, 2012.

Jones, L M, et al., Complementary MS methods assist conformational characterization of antibodies with altered S-S bonding networks, J. Am. Soc. Mass Spectrom., 24, 835-845, 2013. JASMS Joshi, V, T Shivach, N Yadav and A S Rathore, Circular dichroism spectroscopy as a tool for monitoring aggregation in monoclonal antibody therapeutics, Anal. Chem., 86, 11606-11613, 2014.

Kaufman, S L, et al., Macromolecule analysis based on electrophoretic mobility in air: globular proteins. Anal. Chem, 68,1895-1904,1996.

Konermann, L, et al., Mass spectrometry methods for studying structure and dynamics of biological molecules, Anal. Chem., 86, 213-232, 2014.

Lunucara F, S W Holman, C J Gray and CE Eyers, The power of ion mobility-mass spectrometry for structural characterization and the study of conformational dynamics, Nat. Chem., 6, 281-294, 2014.

Lee, J, H Chen, T Liu, C E Berkman and P T A Reilly, High resolution time-of-flight mass analysis of the entire range of singly-charged proteins, Anal. Chem., 83, 9406-9412, 2011.

Pacholarz, K J, et al., Dynamics of intact immunoglobulin G explored by drift-tube ion-mobility mass spectrometry and molecular modeling, Angew. Chem. Int. Ed., 53, 7765-7769, 2014

Pritchard, C, G O'Connor and A E Ashcroft, The role of ion mobility spectrometry-mass spectrometry in the analysis of protein reference standards, Anal. Chem., 85, 7205-7212, 2013.

Rosati, s, Y Yang, A Barendregt and A J R Heck, Detailed mass analysis of structural heterogeneity in monoclonal antibodies using native mass spectrometry, Nat. Protocols, 9, 967-975, 2014.

Scalf, M, M S Westphall, Kraus, S L Kaufman and L M Smith, Controlling charge states of large ions, Science, 28:3, 194497, 1999.

Uetrecht, C, R J Rose, E v Duijn, K Lorenzen and J R Heck, ion mobility mass spectrometry of proteins and protein aggregates, Chem. Soc. Rev., 39, 1633-1655, 2010.

S, B B Stocks, and L Konermann, Partially disordered Proteins Studied by Ion Mobility—: Implications for the Preservation of Solution Phase Structure in the Gas Phase, Anal. Chem., 85, 10471-10478, 2013.

Wyttenbach, T, N A Pierson, D A Clemmer et al, Ion mobility analysis of molecular dynamics, Ann. Rev. Phys. Chem., 65,175-196, 2014.

Zucker, S M, S Lee, N Webber, S J Valentine, J P Reilly and D E Clemmer, An ion mobility/ion trap/photodissociation instrument for characterization of ion structure, J. Am. Soc. Mass Spectrom., 22, 1477-1485, 2010.

All elements, parts and steps described herein are preferably included. It is to be understood that any of these elements, parts and steps may be replaced by other elements, parts and steps or deleted altogether as will be obvious to those skilled in the art.

The foregoing description of the technology has been presented for purposes of illustration and description and is not intended to be exhaustive or to limit the technology to the precise form disclosed. Many modifications and variations are possible in light of the above teaching. The embodiments disclosed were meant only to explain the principles of the technology and its practical application to thereby enable others skilled in the art to best use the technology in various embodiments and with various modifications suited to the particular use contemplated. The scope of the technology is to be defined by the following claims.

We claim:

1. An apparatus, comprising:
    a tubular spectrometer body having an electrically conductive inner wall;
    a rod positioned along the longitudinal center of said tubular spectrometer body; and
    one or more ring electrodes positioned on, but electrically isolated from, said inner wall, wherein the ratio of the radius of said tubular spectrometer body to the radius of said rod is at least 20.

2. The apparatus of claim 1, wherein the ratio of the radius of said tubular spectrometer body to the radius of said rod is within a range from 20 to 10,000.

3. The apparatus of claim 1, further comprising means for applying a voltage between said rod and said inner wall.

4. The apparatus of claim 3, wherein said voltage is a ramped voltage.

5. The apparatus of claim 1, further comprising means for flowing gas through said spectrometer body.

6. The apparatus of claim 1, further comprising means for generating and introducing gas-phase ions in a flow of gas into said spectrometer body.

7. The apparatus of claim 1, further comprising means for measuring an output voltage from at least one of said electrodes, wherein said output voltage is proportional to ion current.

8. The apparatus of claim 1, wherein said electrodes are operatively positioned within said tube to detect specific ions.

9. The apparatus of claim 3, wherein said means for applying a voltage is configured such that said ions will be repelled from said rod toward said one or more electrodes.

10. The apparatus of claim 1, further comprising means for generating an ion mobility spectrum by recording an ion current while voltage applied to said center rod is ramped.

11. The apparatus of claim 1, further comprising means for generating an ion mobility spectrum in which the widths of the ion mobility peaks are used to determine the variation of the size of an ion.

12. The apparatus of claim 1, further comprising means for generating an ion mobility spectrum by recording an ion current during the time the voltage applied to the center rod is ramped and the sample is heated.

13. The apparatus of claim 1, further comprising means for determining the thermal stability of a substance by monitoring the ion current for the substance while the sample is heated.

14. The apparatus of claim 1, further comprising the use of image recognition software and feedback control to provide stable electrospray.

15. The apparatus of claim 1, further comprising a means for controlling a charge-reduction process by providing a physical restriction between the electrospray source and a polonium source.

16. The apparatus of claim 1, further comprising a means for producing an electric field that decreases logarithmically in strength between a center rod and a surrounding cylindrical metal cylinder.

17. The apparatus of claim 1, further comprising a means for producing the body of the spectrometer as the combination of two half-pipes.

18. The apparatus of claim 1, further comprising a means for automated sample analysis.

19. A method, comprising:
providing a tubular spectrometer body having an electrically conductive inner wall;
providing a rod positioned along the longitudinal center of said tubular spectrometer body;
providing one or more ring electrodes positioned on, but electrically isolated from, said inner wall, wherein the ratio of the radius of said tubular spectrometer body to the radius of said rod is at least 20;
directing a flow of gas-phase ions into said spectrometer body while applying a voltage between said rod and said inner wall; and
measuring an output voltage from at least one of said electrodes.

20. The method of claim 19, wherein the ratio of the radius of said tubular spectrometer body to the radius of said rod is within a range from 20 to 10,000.

21. The method of claim 19, wherein said voltage is a ramped voltage.

22. The method of claim 19, further comprising flowing gas through said spectrometer body, wherein said gas-phase ions flow in said flowing gas.

23. The method of claim 19, further comprising measuring an output voltage from at least one of said electrodes, wherein said output voltage is proportional to ion current.

24. The method of claim 19, wherein said electrodes are operatively positioned within said tube to detect specific ions.

25. The method of claim 19, wherein said voltage is applied such that said ions will be repelled from said rod toward said one or more electrodes.

26. The method of claim 19, further comprising generating an ion mobility spectrum by recording an ion current determined from said output voltage.

27. The method of claim 19, further comprising generating an ion mobility spectrum by recording an ion current determined from said output voltage while voltage applied to said center rod is ramped.

28. The method of claim 19, further comprising generating an ion mobility spectrum from said output voltage and determining the variation of the size of an ion from the widths of the ion mobility peaks.

29. The method of claim 19, further comprising generating an ion mobility spectrum from said output voltage by recording an ion current during the time said voltage applied to said center rod is ramped and a sample is heated.

30. The method of claim 19, further comprising means for determining the thermal stability of a substance by monitoring the ion current for a substance while the sample is heated.

31. The method of claim 19, further comprising using image recognition software and feedback control to provide stable electrospray.

32. The method of claim 19, further comprising a controlling a charge-reduction process by providing a physical restriction between an electrospray source and a polonium source.

33. The method of claim 19, further comprising producing an electric field that decreases logarithmically in strength between said center rod and a surrounding cylindrical metal cylinder located within said tubular spectrometer body.

* * * * *